(12) United States Patent
Wang et al.

(10) Patent No.: US 10,387,970 B1
(45) Date of Patent: Aug. 20, 2019

(54) SYSTEMS AND METHODS FOR ANALYZING AND GENERATING EXPLANATIONS FOR CHANGES IN TAX RETURN RESULTS

(71) Applicant: Intuit Inc., Mountain View, CA (US)

(72) Inventors: Gang Wang, San Diego, CA (US); Kevin M. McCluskey, Carlsbad, CA (US); David A. Hanekamp, Jr., Carlsbad, CA (US); Luis F. Cabrera, Bellevue, WA (US); Michael A. Artamonov, San Diego, CA (US)

(73) Assignee: INTUIT INC., Mountain View, CA (US)

( * ) Notice: Subject to any disclaimer, the term of this patent is extended or adjusted under 35 U.S.C. 154(b) by 702 days.

(21) Appl. No.: 14/553,347

(22) Filed: Nov. 25, 2014

(51) Int. Cl.
*G06Q 40/00* (2012.01)
(52) U.S. Cl.
CPC .................. *G06Q 40/123* (2013.12)
(58) Field of Classification Search
CPC .................................................... G06Q 40/123
USPC .......................................................... 705/31
See application file for complete search history.

(56) References Cited

U.S. PATENT DOCUMENTS

| | | | |
|---|---|---|---|
| 4,213,251 A | 7/1980 | Foundos | |
| 4,809,219 A | 2/1989 | Ashford et al. | |
| 5,006,998 A | 4/1991 | Yasunobu | |
| 5,495,607 A | 2/1996 | Pisello et al. | |
| 5,557,761 A | 9/1996 | Chan et al. | |
| 5,673,369 A | 9/1997 | Kim | |
| 5,819,249 A | 10/1998 | Dohanich | |
| 6,078,898 A | 6/2000 | Davis | |
| 6,535,883 B1 | 3/2003 | Lee et al. | |
| 6,601,055 B1 | 7/2003 | Roberts | |

(Continued)

FOREIGN PATENT DOCUMENTS

| JP | 2002-117121 A | 4/2002 |
|---|---|---|
| JP | 2005-190425 A | 7/2005 |

(Continued)

OTHER PUBLICATIONS

Notice of Allowance and Fee(s) dated May 5, 2017 in U.S. Appl. No. 14/206,682, (30pages).

(Continued)

*Primary Examiner* — Jessica Lemieux
(74) *Attorney, Agent, or Firm* — DLA Piper LLP US

(57) ABSTRACT

Systems, methods and articles of manufacture for performing a comparison of tax results based on different sets of tax data, and generating an explanation as to why the tax results differ or do not differ due to the differences in the tax data. The system includes a computing device, a data store in communication with the computing device and a tax preparation software application executable by the computing device. The tax preparation software application has a tax calculation engine, a tax calculation graph, and a change analysis engine. The tax calculation engine is configured to perform a plurality of tax calculation operations based on the tax calculation graph. The change analysis engine is configured to determine whether tax results based on different tax data differ or do not differ. The system may also generate explanation(s) of the reasons that the tax results differ or do not differ due to the different tax data.

16 Claims, 13 Drawing Sheets

(56) References Cited

U.S. PATENT DOCUMENTS

| | | |
|---|---|---|
| 6,631,361 B1 | 10/2003 | O'Flaherty et al. |
| 6,670,969 B1 | 12/2003 | Halstead et al. |
| 6,690,854 B2 | 2/2004 | Helbing |
| 6,697,787 B1 | 2/2004 | Miller |
| 6,898,573 B1 | 5/2005 | Piehl |
| 6,912,508 B1 | 6/2005 | McCalden |
| 7,062,466 B2 | 6/2006 | Wagner |
| 7,234,103 B1 | 6/2007 | Regan |
| 7,295,998 B2 | 11/2007 | Kulkarni |
| 7,331,045 B2 | 2/2008 | Martin et al. |
| 7,448,022 B1 | 11/2008 | Ram et al. |
| 7,539,635 B1 | 5/2009 | Peak et al. |
| 7,565,312 B1 | 7/2009 | Shaw |
| 7,603,301 B1 | 10/2009 | Regan |
| 7,668,763 B1 | 2/2010 | Albrecht |
| 7,680,756 B2 | 3/2010 | Quinn |
| 7,685,082 B1 | 3/2010 | Coletta |
| 7,693,760 B1 | 4/2010 | Fiteni |
| 7,693,769 B1 | 4/2010 | Burlison |
| 7,742,958 B1 | 6/2010 | Leek |
| 7,747,484 B2 | 6/2010 | Stanley |
| 7,761,333 B2 | 7/2010 | Kapp |
| 7,778,895 B1 | 8/2010 | Baxter |
| 7,818,222 B2 | 10/2010 | Allanson |
| 7,849,405 B1 | 12/2010 | Coletta |
| 7,860,763 B1 | 12/2010 | Quinn et al. |
| 7,865,829 B1 | 1/2011 | Goldfield |
| 7,895,102 B1 | 2/2011 | Wilks et al. |
| 7,899,757 B1 | 3/2011 | Talan |
| 7,900,298 B1 | 3/2011 | Char et al. |
| 7,908,190 B2 | 3/2011 | Enenkiel |
| 7,912,768 B2 | 3/2011 | Abeles |
| 7,925,553 B2 | 4/2011 | Banks |
| 8,001,006 B1 | 8/2011 | Yu et al. |
| 8,019,664 B1 | 9/2011 | Tifford et al. |
| 8,082,144 B1 | 12/2011 | Brown et al. |
| 8,086,970 B2 | 12/2011 | Achtermann et al. |
| 8,108,258 B1* | 1/2012 | Slattery ............... G06Q 20/207 705/19 |
| 8,126,820 B1 | 2/2012 | Talan |
| 8,190,499 B1 | 5/2012 | McVickar |
| 8,204,805 B2 | 6/2012 | Eftekhari |
| 8,224,726 B2 | 7/2012 | Murray |
| 8,234,562 B1 | 7/2012 | Evans |
| 8,244,607 B1 | 8/2012 | Quinn |
| 8,346,635 B1 | 1/2013 | Olim |
| 8,346,680 B2 | 1/2013 | Castleman |
| 8,370,795 B1 | 2/2013 | Sage |
| 8,386,344 B2 | 2/2013 | Christina |
| 8,407,113 B1 | 3/2013 | Eftekhari et al. |
| 8,417,596 B1 | 4/2013 | Dunbar et al. |
| 8,417,597 B1 | 4/2013 | McVickar |
| 8,447,667 B1 | 5/2013 | Dinamani et al. |
| 8,452,676 B1 | 5/2013 | Talan |
| 8,473,880 B1 | 6/2013 | Bennett et al. |
| 8,478,671 B1 | 7/2013 | Tifford |
| 8,510,187 B1 | 8/2013 | Dinamani |
| 8,527,375 B1 | 9/2013 | Olim |
| 8,560,409 B2 | 10/2013 | Abeles |
| 8,583,516 B1 | 11/2013 | Pitt |
| 8,589,262 B1 | 11/2013 | Gang |
| 8,607,353 B2 | 12/2013 | Rippert et al. |
| 8,635,127 B1 | 1/2014 | Shaw |
| 8,639,616 B1 | 1/2014 | Rolenaitis |
| 8,682,756 B1 | 3/2014 | Tifford et al. |
| 8,682,829 B2 | 3/2014 | Barthel |
| 8,694,395 B2 | 4/2014 | Houseworth |
| 8,706,580 B2 | 4/2014 | Houseworth |
| 8,788,412 B1 | 7/2014 | Hamm |
| 8,812,380 B2 | 8/2014 | Murray |
| 8,813,178 B1 | 8/2014 | Khanna |
| 8,838,492 B1 | 9/2014 | Baker |
| 8,892,467 B1 | 11/2014 | Ball |
| 9,372,687 B1 | 6/2016 | Pai |
| 9,524,525 B2 | 12/2016 | Manyam |
| 9,760,953 B1 | 9/2017 | Wang et al. |
| 9,916,628 B1 | 3/2018 | Wang et al. |
| 9,922,376 B1 | 3/2018 | Wang et al. |
| 9,990,678 B1 | 6/2018 | Cabrera et al. |
| 2002/0065831 A1 | 5/2002 | DePaolo |
| 2002/0107698 A1 | 8/2002 | Brown et al. |
| 2002/0111888 A1 | 8/2002 | Stanley et al. |
| 2002/0174017 A1 | 11/2002 | Singh |
| 2002/0198832 A1 | 12/2002 | Agee |
| 2003/0101070 A1 | 5/2003 | Mahosky et al. |
| 2003/0126054 A1 | 7/2003 | Purcell |
| 2003/0139827 A1 | 7/2003 | Phelps |
| 2003/0174157 A1 | 9/2003 | Hellman |
| 2003/0182102 A1 | 9/2003 | Corston-Oliver et al. |
| 2004/0002906 A1 | 1/2004 | Von Drehnen et al. |
| 2004/0019540 A1 | 1/2004 | William |
| 2004/0019541 A1 | 1/2004 | William |
| 2004/0021678 A1 | 2/2004 | Ullah et al. |
| 2004/0078271 A1 | 4/2004 | Morano |
| 2004/0083164 A1 | 4/2004 | Schwartz et al. |
| 2004/0088233 A1 | 5/2004 | Brady |
| 2004/0117395 A1 | 6/2004 | Gong |
| 2004/0172347 A1 | 9/2004 | Barthel |
| 2004/0181543 A1 | 9/2004 | Wu et al. |
| 2004/0205008 A1 | 10/2004 | Haynie et al. |
| 2005/0171822 A1 | 8/2005 | Cagan |
| 2005/0216379 A1 | 9/2005 | Ozaki |
| 2005/0262191 A1 | 11/2005 | Mamou et al. |
| 2006/0112114 A1 | 5/2006 | Yu |
| 2006/0155632 A1 | 7/2006 | Cherkas et al. |
| 2006/0178961 A1 | 8/2006 | Stanley et al. |
| 2006/0282354 A1 | 12/2006 | Varghese |
| 2006/0293990 A1 | 12/2006 | Schaub |
| 2007/0033116 A1 | 2/2007 | Murray |
| 2007/0033117 A1 | 2/2007 | Murray |
| 2007/0033130 A1 | 2/2007 | Murray |
| 2007/0094207 A1 | 4/2007 | Yu et al. |
| 2007/0136157 A1 | 6/2007 | Neher et al. |
| 2007/0150387 A1 | 6/2007 | Seubert et al. |
| 2007/0156564 A1 | 7/2007 | Humphrey et al. |
| 2007/0179841 A1 | 8/2007 | Agassi |
| 2007/0192166 A1 | 8/2007 | Van Luchene |
| 2007/0250418 A1 | 10/2007 | Banks et al. |
| 2008/0059900 A1 | 3/2008 | Murray |
| 2008/0097878 A1 | 4/2008 | Abeles |
| 2008/0147494 A1 | 6/2008 | Larson |
| 2008/0162310 A1 | 7/2008 | Quinn |
| 2008/0177631 A1 | 7/2008 | William |
| 2008/0215392 A1 | 9/2008 | Rajan |
| 2008/0243531 A1 | 10/2008 | Hyder et al. |
| 2009/0024694 A1 | 1/2009 | Fong |
| 2009/0037305 A1 | 2/2009 | Sander |
| 2009/0037847 A1 | 2/2009 | Achtermann et al. |
| 2009/0048957 A1 | 2/2009 | Celano |
| 2009/0064851 A1 | 3/2009 | Morris et al. |
| 2009/0117529 A1 | 5/2009 | Goldstein |
| 2009/0125618 A1 | 5/2009 | Huff |
| 2009/0138389 A1 | 5/2009 | Barthel |
| 2009/0150169 A1 | 6/2009 | Kirkwood |
| 2009/0157572 A1 | 6/2009 | Chidlovskii |
| 2009/0193389 A1 | 7/2009 | Miller |
| 2009/0204881 A1 | 8/2009 | Murthy |
| 2009/0239650 A1 | 9/2009 | Alderucci et al. |
| 2009/0248594 A1 | 10/2009 | Castleman |
| 2009/0248603 A1 | 10/2009 | Kiersky |
| 2010/0036760 A1 | 2/2010 | Abeles |
| 2010/0088124 A1 | 4/2010 | Diefendorf et al. |
| 2010/0131394 A1 | 5/2010 | Rutsch |
| 2010/0153138 A1 | 6/2010 | Evans |
| 2011/0004537 A1 | 1/2011 | Allanson et al. |
| 2011/0078062 A1 | 3/2011 | Kleyman |
| 2011/0145112 A1 | 6/2011 | Abeles |
| 2011/0225220 A1 | 9/2011 | Huang et al. |
| 2011/0258195 A1 | 10/2011 | Welling |
| 2011/0258610 A1 | 10/2011 | Aaraj et al. |
| 2011/0264569 A1 | 10/2011 | Houseworth |
| 2012/0016817 A1 | 1/2012 | Smith et al. |
| 2012/0027246 A1 | 2/2012 | Tifford |
| 2012/0030076 A1 | 2/2012 | Checco et al. |

(56) References Cited

U.S. PATENT DOCUMENTS

| | | | |
|---|---|---|---|
| 2012/0030577 | A1 | 2/2012 | Akolkar et al. |
| 2012/0072321 | A1 | 3/2012 | Christian et al. |
| 2012/0109792 | A1 | 5/2012 | Eftekhari |
| 2012/0109793 | A1 | 5/2012 | Abeles |
| 2012/0136764 | A1 | 5/2012 | Miller |
| 2012/0173358 | A1* | 7/2012 | Soroca .................. G06Q 30/02 705/26.3 |
| 2012/0278365 | A1 | 11/2012 | Labat et al. |
| 2013/0036347 | A1 | 2/2013 | Eftekhari |
| 2013/0080302 | A1 | 3/2013 | Allanson et al. |
| 2013/0097262 | A1 | 4/2013 | Dandison |
| 2013/0111032 | A1 | 5/2013 | Alapati et al. |
| 2013/0138586 | A1 | 5/2013 | Jung et al. |
| 2013/0185347 | A1 | 7/2013 | Romano |
| 2013/0187926 | A1 | 7/2013 | Silverstein et al. |
| 2013/0198047 | A1 | 8/2013 | Houseworth |
| 2013/0218735 | A1 | 8/2013 | Murray |
| 2013/0262279 | A1 | 10/2013 | Finley et al. |
| 2013/0282539 | A1 | 10/2013 | Murray |
| 2013/0290169 | A1 | 10/2013 | Bathula |
| 2014/0108213 | A1 | 4/2014 | Houseworth |
| 2014/0172656 | A1 | 6/2014 | Shaw |
| 2014/0201045 | A1 | 7/2014 | Pai et al. |
| 2014/0207633 | A1 | 7/2014 | Aldrich et al. |
| 2014/0241631 | A1 | 8/2014 | Huang |
| 2014/0244455 | A1 | 8/2014 | Huang |
| 2014/0244457 | A1 | 8/2014 | Howell et al. |
| 2014/0337189 | A1 | 11/2014 | Barsade et al. |
| 2015/0142703 | A1 | 5/2015 | Rajesh |
| 2015/0237205 | A1 | 8/2015 | Waller et al. |
| 2015/0254623 | A1 | 9/2015 | Velez et al. |
| 2015/0269491 | A1 | 9/2015 | Tripathi et al. |
| 2016/0027127 | A1 | 1/2016 | Chavarria et al. |
| 2016/0063645 | A1 | 3/2016 | Houseworth et al. |
| 2016/0078567 | A1* | 3/2016 | Goldman ............. G06Q 40/123 705/31 |
| 2016/0092993 | A1 | 3/2016 | Ciaramitaro |
| 2016/0092994 | A1 | 3/2016 | Roebuck et al. |
| 2016/0098804 | A1 | 4/2016 | Mascaro et al. |
| 2016/0148321 | A1 | 5/2016 | Ciaramitaro et al. |
| 2016/0275627 | A1 | 9/2016 | Wang |
| 2017/0004583 | A1 | 1/2017 | Wang |
| 2017/0004584 | A1 | 1/2017 | Wang |
| 2017/0032468 | A1 | 2/2017 | Wang |

FOREIGN PATENT DOCUMENTS

| | | |
|---|---|---|
| JP | 2014-206960 A | 10/2014 |
| KR | 10-2012-0011987 A | 2/2012 |
| WO | 2018/080562 A1 | 5/2018 |
| WO | 2018/080563 A1 | 5/2018 |

OTHER PUBLICATIONS

PCT International Search Report for PCT/US2016/044094, Applicant: Intuit Inc., Form PCT/ISA/210 and 220, dated Apr. 24, 2017 (5pages).

PCT Written Opinion of the International Search Authority for PCT/US2016/044094, Applicant: Intuit Inc., Form PCT/ISA/237, dated Apr. 24, 2017 (5pages).

PCT International Search Report for PCT/US2016/067839, Applicant: Intuit Inc., Form PCT/ISA/210 and 220, dated Apr. 25, 2017 (5pages).

PCT Written Opinion of the International Search Authority for PCT/US2016/067839, Applicant: Intuit Inc., Form PCT/ISA/237, dated Apr. 26, 2017 (12pages).

Amendment dated May 3, 2017 in U.S. Appl. No. 14/462,411, filed Aug. 18, 2014, (5pages).

Response dated May 15, 2017 in U.S. Appl. No. 14/448,962, filed Jul. 31, 2014, (30pages).

Office Action dated May 15, 2017 in U.S. Appl. No. 14/462,345, filed Aug. 18, 2014, (57pages).

Office Action dated May 15, 2017 in U.S. Appl. No. 14/555,902, filed Nov. 28, 2014, (8pages).

Office Action dated May 2, 2017 in U.S. Appl. No. 14/698,733, filed Apr. 28, 2015, (31pages).

Office Action dated Nov. 17, 2016 in U.S. Appl. No. 14/448,922, filed Jul. 31, 2014, inventor: Gang Wang.

Amendment dated Feb. 17, 2016 in U.S. Appl. No. 14/448,922, filed Jul. 31, 2014, inventor: Gang Wang.

Office Action dated Apr. 6, 2017 in U.S. Appl. No. 14/448,922, filed Jul. 31, 2014, inventor: Gang Wang.

Office Action dated Aug. 11, 2016 in U.S. Appl. No. 14/448,962, filed Jul. 31, 2014, inventor: Gang Wang.

Amendment dated Nov. 11, 2016 in U.S. Appl. No. 14/448,962, filed Jul. 31, 2014, inventor: Gang Wang.

Office Action dated Jan. 13, 2017 in U.S. Appl. No. 14/448,962, filed Jul. 31, 2014, inventor Gang Wang.

Office Action dated Aug. 23, 2016 in U.S. Appl. No. 14/448,986, filed Jul. 31, 2014, inventor: Gang Wang.

Response dated Jan. 23, 2017 in U.S. Appl. No. 14/448,986, filed Jul. 31, 2014, inventor: Gang Wang.

Office Action dated Feb. 17, 2017 in U.S. Appl. No. 14/448,986, filed Jul. 31, 2014, inventor: Gang Wang.

Office Action dated Jan. 12, 2017 in U.S. Appl. No. 14/462,411, filed Aug. 18, 2014, inventor: Gang Wang.

Office Action dated Feb. 7, 2017 in U.S. Appl. No. 14/555,543, filed Nov. 26, 2014, inventor: Gang Wang.

PCT International Search Report for PCT/US2016/039919, Applicant: Intuit Inc., Form PCT/ISA/210 and 220, dated Oct. 11, 2016.

PCT Written Opinion of the International Search Authority for PCT/US2016/039919, Applicant: Intuit Inc., Form PCT/ISA/237, dated Oct. 11, 2016.

PCT International Search Report for PCT/US2016/039917, Applicant: Intuit Inc., Form PCT/ISA/210 and 220, dated Oct. 11, 2016.

PCT Written Opinion of the International Search Authority for PCT/US2016/039917, Applicant: Intuit Inc., Form PCT/ISA/237, dated Oct. 11, 2016.

PCT International Search Report for PCT/US2016/039918, Applicant: Intuit Inc., Form PCT/ISA/210 and 220, dated Oct. 11, 2016.

PCT Written Opinion of the International Search Authority for PCT/US2016/039918, Applicant: Intuit Inc., Form PCT/ISA/237, dated Oct. 11, 2016.

PCT International Search Report for PCT/US2016/039913, Applicant: Intuit Inc., Form PCT/ISA/210 and 220, dated Oct. 21, 2016.

PCT Written Opinion of the International Search Authority for PCT/US2016/039913, Applicant: Intuit Inc., Form PCT/ISA/237, dated Oct. 21, 2016.

PCT International Search Report for PCT/US2016/039916, Applicant: Intuit Inc., Form PCT/ISA/210 and 220, dated Oct. 11, 2016.

PCT Written Opinion of the International Search Authority for PCT/US2016/039916, Applicant: Intuit Inc., Form PCT/ISA/237, dated Oct. 11, 2016.

http://en.wikipedia.org/wiki/Dependency_grammar#Semantic_dependencies, printed Mar. 11, 2014.

http://www.webopedia.com/TERM/L/loose_coupling.html, printed Mar. 11, 2014.

http://en.wikipedia.org/wiki/Loose_coupling, printed Mar. 11, 2014.

www.turbotax.com, printed Mar. 11, 2014.

https://turbotax.intuit.com/snaptax/mobilet, printed Mar. 11, 2014.

http://www.jboss.org/drools/drools-expert.html, printed Mar. 11, 2014.

http://en.wikipedia.org/wiki/Drools, printed Mar. 11, 2014.

http://en.wikipedia.org/wiki/Declarative_programming, printed Mar. 11, 2014.

http://www.wisegeek.com/what-is-declarative-programming.htm, printed Mar. 11, 2014.

http://docs.jboss.org/drools/release/5.3.0.Final/drools-expert-docs/html/ch01.html, printed Mar. 11, 2014.

http://quicken.intuit.com/support/help/tax-savings/simplify-tax-time/INF24047.html, updated Jul. 25, 2013, printed Jun. 24, 2014 (11 pages).

http://quicken.intuit.com/support/help/income-and-expenses/how-to-assign-tax-form-line-items-to-a-category/ GEN82142.html, updated Aug. 11, 2011, printed Jun. 24, 2014 (2 pages).

(56) References Cited

OTHER PUBLICATIONS http://quicken.intuit.com/support/help/reports--graphs-and-snapshots/track-the-earnings--taxes--deductions--or-deposits-from-paychecks/GEN82101.html, updated May 14, 2012, printed Jun. 24, 2014 (2 pages).
NY State Dep of Taxation, NY State Personal Income Tax MeF Guide for Software Developers, 2012, NY State.
Restriction Requirement dated May 22, 2015 in U.S. Appl. No. 14/097,057, filed Dec. 4, 2013, inventor: Gang Wang.
Response dated Jun. 30, 2015 in U.S. Appl. No. 14/097,057, filed Dec. 4, 2013, inventor: Gang Wang.
Office Action dated Oct. 2, 2015 in U.S. Appl. No. 14/097,057, filed Dec. 4, 2013, inventor: Gang Wang.
Response dated Feb. 29, 2016 in U.S. Appl. No. 14/097,057, filed Dec. 4, 2013, inventor: Gang Wang.
Final Office Action dated Apr. 8, 2016 in U.S. Appl. No. 14/097,057, filed Dec. 4, 2013, inventor: Gang Wang.
Pre-Appeal Brief dated Jun. 24, 2016 in U.S. Appl. No. 14/097,057, filed Dec. 4, 2013, inventor: Gang Wang.
Pre-Appeal Brief Conference Decision dated Aug. 15, 2016 in U.S. Appl. No. 14/097,057, filed Dec. 4, 2013, inventor: Gang Wang.
Amendment dated Sep. 13, 2016 in U.S. Appl. No. 14/097,057, filed Dec. 4, 2013, inventor: Gang Wang.
Office Action dated Nov. 4, 2016 in U.S. Appl. No. 14/097,057, filed Dec. 4, 2013, inventor: Gang Wang.
Amendment dated Feb. 6, 2017 in U.S. Appl. No. 14/097,057, filed Dec. 4, 2013, inventor: Gang Wang.
Final Rejection dated Mar. 9, 2017 in U.S. Appl. No. 14/097,057, filed Dec. 4, 2013, inventor: Gang Wang.
Office Action dated Dec. 23, 2016 in U.S. Appl. No. 14/462,345, filed Aug. 18, 2014, inventor: Gang Wang.
Amendment dated Mar. 23, 2017 in U.S. Appl. No. 14/462,345, filed Aug. 18, 2014, inventor: Gang Wang.
Office Action dated Mar. 10, 2017 in U.S. Appl. No. 14/448,678, filed Jul. 31, 2014, inventor Gang Wang.
Office Action dated Jul. 8, 2015 in U.S. Appl. No. 14/206,682, filed Mar. 12, 2015, inventor: Gang Wang.
Response dated Aug. 31, 2015 in U.S. Appl. No. 14/206,682, filed Mar. 12, 2015, inventor: Gang Wang.
Office Action dated Mar. 9, 2016 in U.S. Appl. No. 14/206,682, filed Mar. 12, 2015, inventor: Gang Wang.
Amendment dated Jul. 11, 2016 in U.S. Appl. No. 14/206,682, filed Mar. 12, 2015, inventor: Gang Wang.
Office Action dated Sep. 16, 2016 in U.S. Appl. No. 14/206,682, filed Mar. 12, 2015, inventor: Gang Wang.
Amendment dated Jan. 13, 2017 in U.S. Appl. No. 14/206,682, filed Mar. 12, 2015, inventor: Gang Wang.
Dffice Action dated Dec. 31, 2015 in U.S. Appl. No. 14/206,834, filed Mar. 12, 2015, inventor: Gang Wang.
Amendment dated May 31, 2016 in U.S. Appl. No. 14/206,834, filed Mar. 12, 2015, inventor: Gang Wang.
Office Action dated Sep. 6, 2016 in U.S. Appl. No. 14/206,834, filed Mar. 12, 2015, inventor: Gang Wang.
Amendment dated Jan. 6, 2017 in U.S. Appl. No. 14/206,834, filed Mar. 12, 2015, inventor: Gang Wang.
Office Action dated Apr. 30, 2015 in U.S. Appl. No. 14/207,121, filed Mar. 12, 2015, inventor: Gang Wang.
Response dated Apr. 30, 2015 in U.S. Appl. No. 14/207,121, filed Mar. 12, 2015, inventor: Gang Wang.
Office Action dated Jul. 30, 2015 in U.S. Appl. No. 14/207,121, filed Mar. 12, 2015, inventor Gang Wang.
Response dated Nov. 30, 2015 in U.S. Appl. No. 14/207,121, filed Mar. 12, 2015, inventor: Gang Wang.
Office Action dated Apr. 29, 2016 in U.S. Appl. No. 14/207,121, filed Mar. 12, 2015, inventor: Gang Wang.
Amendment dated Aug. 29, 2016 in U.S. Appl. No. 14/207,121, filed Mar. 12, 2015, inventor: Gang Wang.
Office Action dated Dec. 14, 2016 in U.S. Appl. No. 14/462,315, filed Aug. 18, 2014, inventor: Gang Wang.
Response dated Mar. 14, 2017 in U.S. Appl. No. 14/462,315, filed Aug. 18, 2014, inventor: Gang Wang.
Office Action dated Mar. 21, 2017 in U.S. Appl. No. 14/448,481, filed Jul. 31, 2014, inventor Gang Wang.
Office Action dated Nov. 29, 2016 in U.S. Appl. No. 14/448,886, filed Jul. 31, 2014, inventor: Gang Wang.
Amendment dated Feb. 28, 2017 in U.S. Appl. No. 14/448,886, filed Jul. 31, 2014, inventor: Gang Wang.
Office Action dated Apr. 20, 2017 in U.S. Appl. No. 14/448,886, filed Jul. 31, 2014, inventor: Gang Wang.
Amendment and Response dated Nov. 9, 2017 in U.S. Appl. No. 14/097,057, (31pgs.).
Vanderbilt University, "Free tax prep help available for Vanderbilt employees", Feb. 6, 2014, Vanderbilt University, p. 1-3 [NPL-1].
Amendment and Response dated Nov. 2, 2017 in U.S. Appl. No. 14/673,261, (30pgs.).
Office Action dated Oct. 30, 2017 in U.S. Appl. No. 14/448,678, (39pgs.).
Amendment and Response dated Oct. 30, 2017 in U.S. Appl. No. 14/555,553, (17pgs.).
Notice of Allowance dated Nov. 3, 2017 in U.S. Appl. No. 14/529,736, (13pgs.).
Interview Summary dated Sep. 28, 2017 in U.S. Appl. No. 14/529,736, (3pgs.).
Office Action dated Sep. 14, 2017 in U.S. Appl. No. 14/530,159, (41pgs.).
Amendment and Response dated Nov. 21, 2017 in U.S. Appl. No. 14/755,684, (23pgs.).
Office Action dated Nov. 15, 2017 in U.S. Appl. No. 14/206,834, (100pgs.).
Office Action dated Sep. 8, 2017 in U.S. Appl. No. 14/555,939, (92pgs.).
Amendment and Response dated Sep. 28, 2017 in U.S. Appl. No. 14/207,121, (38pgs.).
Office Action dated Sep. 14, 2017 in U.S. Appl. No. 14/557,335, (57pgs.).
Amendment and Response dated Aug. 7, 2017 in U.S. Appl. No. 14/462,315, (10pgs.).
Advisory Action dated Aug. 24, 2017 in U.S. Appl. No. 14/462,315, (3pgs.).
Amendment and Response and Request for Continued Examination dated Sep. 6, 2017 in U.S. Appl. No. 14/462,315, (43pgs.).
Amendment and Response dated Sep. 21, 2017 in U.S. Appl. No. 14/448,481, (44pgs.).
Office Action dated Jun. 22, 2017 in U.S. Appl. No. 14/698,746, (50pgs.).
Amendment and Response dated Sep. 22, 2017 in U.S. Appl. No. 14/698,746, (26pgs.).
Office Action dated Oct. 13, 2017 in U.S. Appl. No. 14/462,397, (72pgs.).
Office Action dated Nov. 30, 2017 in U.S. Appl. No. 14/462,373, (72pgs.).
Office Action dated Jun. 27, 2017 in U.S. Appl. No. 14/755,859, (174pgs.).
Amendment and Response dated Nov. 27, 2017 in U.S. Appl. No. 14/755,859, (53pgs.).
Amendment and Response dated Jun. 20, 2017 in U.S. Appl. No. 14/448,886, (14pgs.).
Advisory Action dated Jul. 5, 2017 in U.S. Appl. No. 14/448,886, (4pgs.).
Amendment and Response dated Aug. 21, 2017 in U.S. Appl. No. 14/448,886, (37pgs.).
Office Action dated Nov. 28, 2017 in U.S. Appl. No. 14/448,886, (65pgs.).
Amendment and Response and Request for Continued Examination dated Sep. 6, 2017 in U.S. Appl. No. 14/448,922, (36pgs.).
Office Action dated Nov. 28, 2017 in U.S. Appl. No. 14/448,922, (65pgs.).
Office Action dated Oct. 10, 2017 in U.S. Appl. No. 14/448,962, (27pgs.).
Office Action dated Oct. 16, 2017 in U.S. Appl. No. 14/448,986, (30pgs.).

(56) References Cited

OTHER PUBLICATIONS

OpenRules, Preparing a Tax Return Using OpenRules Dialog, Aug. 2011 (Year: 2011) (25pgs.).
Amendment and Response and Request for Continued Examination dated Sep. 6, 2017 in U.S. Appl. No. 14/462,411, (24pgs.).
Amendment and Response dated Nov. 7, 2017 in U.S. Appl. No. 14/555,334, (26pgs.).
Advisory Action dated Nov. 22, 2017 in U.S. Appl. No. 14/555,334, (2pgs.).
Office Action dated Oct. 11, 2017 in U.S. Appl. No. 14/701,030, (53pgs.).
Office Action dated Aug. 25, 2017 in U.S. Appl. No. 14/673,646, (65pgs.).
Office Action dated Jul. 10, 2017 in U.S. Appl. No. 14/555,222, (63pgs.).
Amendment and Response dated Nov. 10, 2017 in U.S. Appl. No. 14/555,222, (25pgs.).
Office Action dated Nov. 3, 2017 in U.S. Appl. No. 14/701,087, (103pgs.).
Office Action dated Jun. 27, 2017 in U.S. Appl. No. 14/675,166, (46pgs.).
Amendment and Response dated Oct. 27, 2017 in U.S. Appl. No. 14/675,166, (25pgs.).
Response dated Jun. 23, 2017 in U.S. Appl. No. 14/555,296, (7pgs.).
Office Action dated Oct. 20, 2017 in U.S. Appl. No. 14/555,296, (50pgs.).
Office Action dated Aug. 18, 2017 in U.S. Appl. No. 14/555,543, (42pgs.).
Interview Summary dated Oct. 25, 2017 in U.S. Appl. No. 14/555,543, (3pgs.).
Office Action dated Sep. 25, 2017 in U.S. Appl. No. 14/700,981, (52pgs.).
Office Action dated Aug. 25, 2017 in U.S. Appl. No. 14/673,555, (65pgs.).
Office Action dated Sep. 28, 2017 in U.S. Appl. No. 14/701,149, (71pgs.).
Final Office Action dated Jun. 6, 2017 in U.S. Appl. No. 14/462,411, (20pges).
Amendment After Final Office Action dated Jun. 6, 2017 in U.S. Appl. No. 14/448,922, (8pages).
Interview Summary dated Jun. 7, 2017 in U.S. Appl. No. 14/448,922, (2pages).
Advisory Action dated Jun. 14, 2017 in U.S. Appl. No. 14/448,922, (4pages).
Amendment After Final Office Action dated Jun. 20, 2017 in U.S. Appl. No. 14/448,922, (14pages).
Response dated Sep. 21, 2017 in U.S. Appl. No. 14/448,481, (44pages).
Office Action dated Jun. 2, 2017 in U.S. Appl. No. 14/673,261, (65pages).
Office Action dated May 25, 2017 in U.S. Appl. No. 14/529,736, (42pages).
Office Action dated Jun. 6, 2017 in U.S. Appl. No. 14/462,315, (54pages).
Amendment and Response dated Jun. 2, 2017 in U.S. Appl. No. 14/448,986, (12pages).
Interview Summary dated Jun. 2, 2017 in U.S. Appl. No. 14/448,986, (3pages).
Office Action dated Jun. 7, 2017 in U.S. Appl. No. 14/555,334, (54pages).
Office Action dated Jun. 7, 2017 in U.S. Appl. No. 14/555,296, (7pages).
Response dated Jun. 7, 2017 in U.S. Appl. No. 14/555,543, (21pages).
Amendment dated Jun. 9, 2017 in U.S. Appl. No. 14/097,057, (26pages).
Office Action dated Jun. 22, 2017 in U.S. Appl. No. 14/698,746, (50pages).
Response to Restriction Requirement dated Jul. 5, 2017 in U.S. Appl. No. 14/555,902, (12pages).
PCT International Search Report for PCT/US2016/067866 Applicant: Intuit Inc., Form PCT/ISA/210 and 220, dated Jul. 26, 2017 (5pages).
PCT Written Opinion of the International Search Authority for PCT/US2016/067866, Applicant: Intuit Inc., Form PCT/ISA/237, dated Jul. 26, 2017 (4pages).
PCT International Search Report for PCT/US2016/067867 Applicant: Intuit Inc., Form PCT/ISA/210 and 220, dated Jul. 26, 2017 (5pages).
PCT Written Opinion of the International Search Authority for PCT/US2016/067867, Applicant: Intuit Inc., Form PCT/ISA/237, dated Jul. 26, 2017 (9pages).
Response to Office Action dated Jul. 17, 2017 in U.S. Appl. No. 14/462,345, (17pages).
Advisory Action dated Jul. 31, 2017 in U.S. Appl. No. 14/462,345, (3pages).
Request for Continued Examination and Response dated Aug. 14, 2017 in U.S. Appl. No. 14/462,345, (17pages).
office Action dated Aug. 9, 2017 in U.S. Appl. No. 14/097,057, (47pages).
Office Action dated Aug. 25, 2017 in U.S. Appl. No. 14/673,555, (71pages).
Response dated Aug. 15, 2017 in U.S. Appl. No. 14/698,733, (24pages).
Response dated Aug. 10, 2017 in U.S. Appl. No. 14/448,678, (41pages).
Office Action dated Jul. 28, 2017 in U.S. Appl. No. 14/555,553, (52pages).
Office Action dated Aug. 21, 2017 in U.S. Appl. No. 14/755,684, (43pages).
Response dated Jul. 5, 2017 in U.S. Appl. No. 14/555,902, (12pages).
Office Action dated Sep. 8, 2017 in U.S. Appl. No. 14/555,939, (92pages).
Office Action dated Jun. 28, 2017 in U.S. Appl. No. 14/207,121, (29pages).
Office Action dated Sep. 14, 2017 in U.S. Appl. No. 14/557,335, (57pages).
Response dated Aug. 7, 2017 in U.S. Appl. No. 14/462,315, (10pages).
Advisory Action dated Aug. 24, 2017 in U.S. Appl. No. 14/462,315, (3pages).
Request for Examination and Response dated Sep. 6, 2017 in U.S. Appl. No. 14/462,315, (43pages).
Office Action dated Jun. 27, 2017 in U.S. Appl. No. 14/755,859, (174pages).
Advisory Action dated Jul. 5, 2017 in U.S. Appl. No. 14/448,922, (4pages).
Request for Continued Examination and Amendment dated Aug. 21, 2017 in U.S. Appl. No. 14/448,922, (37pages).
Request for Continued Examination and Amendment dated Sep. 6, 2017 in U.S. Appl. No. 14/448,922, (36pages).
Request for Continued Examination and Amendment dated Sep. 6, 2017 in U.S. Appl. No. 14/462,411, (24pages).
Office Action dated Aug. 25, 2017 in U.S. Appl. No. 14/673,646, (65pages).
Office Action dated Jun. 27, 2017 in U.S. Appl. No. 14/675,166, (46pages).
Response dated Jun. 23, 2017 in U.S. Appl. No. 14/555,293, (7pages).
Office Action dated Jul. 10, 2017 in U.S. Appl. No. 14/555,222, (63pages).
Office Action dated Aug. 18, 2017 in U.S. Appl. No. 14/555,543, (42pages).
Office Communication dated Apr. 4, 2018 in Canadian Patent Application No. 2,959,230, (6pages).
Supplementary Search Report dated Mar. 26, 2018 in European Patent Application No. 16843282.1-1217, (6pages).
Amendment and Response to Office Action for U.S. Appl. No. 14/462,345 dated Apr. 12, 2018, (15pages).
Communication pursuant to Rules 70(2) and 70a(2) EPC dated Apr. 25, 2018 in European Patent Application No. 16843282.1-1217, (1page).

(56) References Cited

OTHER PUBLICATIONS

Solomon L. Pollack; Analysis of the Decision Rules in Decision Tables, May 1963; The Rand Corooration; pp. iii, iv, 1, 20, & 24 (Year: 1963).
H.R. Gregg; Decision Tables for Documentation and System Analysis; Oct. 3, 1967; Union Carbide Corporation, Nuclear Division, Computing Technology Center: pp. 5, 6, 18, 19, & 21 (Year: 1967).
Amendment and Response to Office Action for U.S. Appl. No. 14/673,261 dated Apr. 23, 2018, (39pages).
Advisory Action for U.S. Appl. No. 14/673,261 dated May 14, 2018, (9pages).
Amendment and Response to Office Action for U.S. Appl.No. 14/698,733 dated Mar. 30, 2018, (39pages).
Office Action for U.S. Appl. No. 14/462,058 dated Apr. 27, 2018, (47pages).
Amendment and Response to Final and Advisory Actions and Request for Continued Examination for U.S. Appl. No. 14/448,678 dated Mar. 5, 2018, (25pages).
Amendment and Response for U.S. Appl. No. 14/555,553 dated Apr. 12, 2018, (24pages).
Advisory Action for U.S. Appl. No. 14/555,553 dated Apr. 24, 2018, (3pages).
Amendment and Response to Final Office Action and Request for Continued Examination for U.S. Appl. No. 14/555,553 dated May 11, 2018, (25pages).
Amendment and Response for U.S. Appl. No. 14/529,798 dated Mar. 28, 2018, (23pages).
Response for U.S. Appl. No. 14/755,684 dated Mar. 12, 2018, (23pages).
Advisory Action for U.S. Appl. No. 14/755,684 dated Mar. 30, 2018, (2pages).
Response for U.S. Appl. No. 14/755,684 dated Apr. 4, 2018, (23pages).
Office Action for U.S. Appl. No. 14/555,902 dated May 17, 2018, (23pages).
Response for U.S. Appl. No. 14/207,121 dated Mar. 19, 2018, (34pages).
Advisory Action for U.S. Appl. No. 14/207,121 dated Apr. 6, 2018 (3pages).
Response for U.S. Appl. No. 14/462,315 dated May 9, 2018, (33pages).
Office Action for U.S. Appl. No. 14/698,746 dated Feb. 28, 2018, (14pages).
Response for U.S. Appl. No. 14/698,746 dated Apr. 30, 2018, (18pages).
Advisory Action for U.S. Appl. No. 14/698,746 dated May 15, 2018, (3pages).
Response for U.S. Appl. No. 14/462,397 dated Feb. 20, 2018, (33pages).
Response for U.S. Appl. No. 14/462,373 dated Feb. 28, 2018, (25pages).
Office Action for U.S. Appl. No. 14/755,859 dated Mar. 21, 2018, (57pages).
Response for U.S. Appl. No. 14/755,859 dated May 21, 2018, (8pages).
Response for U.S. Appl. No. 14/448,886 dated Feb. 28, 2018, (31pages).
Amendment for U.S. Appl. No. 14/448,922 dated Feb. 28, 2018, (27pages).
Office Action for U.S. Appl. No. 14/448,922 dated May 16, 2018, (41pages).
Office Action for U.S. Appl. No. 14/448,962 dated Apr. 13, 2018, (17pages).
Office Action for U.S. Appl. No. 14/448,986 dated May 11, 2018, (15pages).
Response for U.S. Appl. No. 14/448,986 dated May 8, 2018, (27pages).
Response for U.S. Appl. No. 14/555,334 dated Apr. 4, 2018, (14pages).
Advisory Action for U.S. Appl. No. 14/555,334 dated Apr. 17, 2018, (2pages).
Response for U.S. Appl. No. 14/555,334 dated May 7, 2018, (41pages).
Office Action for U.S. Appl. No. 14/673,646 dated Feb. 28, 2018, (19pages).
Response for U.S. Appl. No. 14/673,646 dated Mar. 30, 2018, (22pages).
Response for U.S. Appl. No. 14/701,087 dated Apr. 2, 2018, (41pages).
Amendment After Allowance for U.S. Appl. No. 14/675,166, (5pages).
Supplemental Notice of Allowability for U.S. Appl. No. 14/675,166, (3pages).
Response for U.S. Appl. No. 14/555,296, (23pages).
Response for U.S. Appl. No. 14/555,222, (8pages).
Office Action for U.S. Appl. No. 14/700,981, (28pages).
Office Action for U.S. Appl. No. 14/673,555, (43pages).
Office Action issued in U.S. Appl. No. 14/673,261 dated Apr. 26, 2019.

* cited by examiner

FIG. 3 → Transform

| | Rule₁ (32a) | Rule₂ (32b) | Rule₃ (32c) | Rule₄ (32d) | Rule₅ (32e) |
|---|---|---|---|---|---|
| Q_A (34a) | Y | Y | N | N | N |
| Q_B (34b) | ? | ? | Y | Y | N |
| Q_C (34c) | N | Y | ? | ? | ? |
| Q_D (34d) | ? | ? | ? | ? | N |
| Q_E (34e) | ? | ? | Y | N | ? |
| Q_F (34f) | ? | ? | ? | N | N |
| Q_G (34g) | ? | Y | Y | ? | ? |
| Goal (34h) | Yes | Yes | Yes | Yes | Yes |

| | $Q_A$ | $Q_B$ | $Q_C$ | $Q_D$ | $Q_E$ | $Q_F$ | $Q_G$ | STAT1 | STAT2 |
|---|---|---|---|---|---|---|---|---|---|
| Rule$_1$ | Y | ? | ? | ? | N | ? | ? | 40% | 10% |
| Rule$_2$ | N | Y | Y | ? | ? | ? | N | 20% | 5% |
| Rule$_3$ | N | Y | N | Y | ? | N | ? | 14% | 6% |
| Rule$_4$ | Y | ? | ? | ? | N | Y | N | 65% | 20% |
| Rule$_5$ | N | Y | N | ? | ? | ? | Y | 18% | 40% |
| Rule$_6$ | Y | Y | N | ? | ? | N | ? | 5% | 25% |

FIG. 5

SYSTEMS AND METHODS FOR ANALYZING AND GENERATING EXPLANATIONS FOR CHANGES IN TAX RETURN RESULTS

SUMMARY

Embodiments of the present invention are directed to computerized systems and methods for preparing an electronic tax return using a tax return preparation application; and more particularly, to systems and methods for analyzing changes in tax return results based on modifications to tax return data and generating explanations for such changes in tax return results.

The embodiments of the present invention may be implemented on and/or within a tax return preparation system comprising a tax preparation software application executing on a computing device. The tax return preparation system may operate on a new construct in which tax rules and the calculations based thereon are established in declarative data-structures, namely, completeness graph(s) and tax calculation graph(s). The tax calculation graph(s) comprise a plurality of nodes including input nodes, functional nodes, and function nodes. The tax calculation graph(s) are also configured with a plurality of calculation paths wherein each calculation path connects a plurality of nodes which are data dependent such that a node is connected to another node if the node depends on the other node. Use of these data-structures permits the user interface to be loosely connected or even divorced from the tax calculation engine and the data used in the tax calculations. Tax calculations are dynamically calculated based on tax-related data that is input from a user, derived from sourced data, or estimated. A smart tax logic agent running on a set of rules can review current run time data and evaluate missing tax data necessary to prepare and complete a tax return. The tax logic agent proposes suggested questions to be asked to a user to fill in missing blanks. This process can be continued until completeness of all tax topics has occurred. A completed tax return (e.g., a printed tax return or an electronic tax return) can then be electronically prepared and filed (electronically and/or in paper form) with respect to the relevant taxing jurisdictions.

In another aspect of the tax return preparation system, the system is configured to operate the computing device to establish a connection to a data store configured to store user-specific tax data therein. The computing device executes a tax calculation engine configured to read and write tax calculation data to and from the shared data store, the tax calculation engine using one or more of the tax calculation graphs specific to particular tax topics. The computing device executes a tax logic agent, the tax logic agent reading from the shared data store and a plurality of decision tables collectively representing a completion graph for computing tax liability or a portion thereof, the tax logic agent outputting one or more suggestions for missing tax data based on an entry in one of the plurality of decision tables. The computing device executes a user interface manager configured to receive the one or more suggestions and present to a user one or more questions based on the one or more suggestions via a user interface, wherein a user response to the one or more questions is input to the shared data store. The user interface manager is configured to generate and display a question screen to the user. The question screen includes a question for the user requesting tax data and is also configured to receive the tax data from the user in the form of input from the user. The user interface manager which receives the suggestion(s) selects one or more suggested questions to be presented to a user. Alternatively, the user interface manager may ignore the suggestion(s) and present a different question or prompt to the user.

In the event that all tax topics are covered, the tax logic agent, instead of outputting one or more suggestions for missing tax data may output a "done" instruction to the user interface manager. The computing device may then prepare a tax return based on the data in the shared data store. The tax return may be a conventional paper-based return or, alternatively, the tax return may be an electronic tax return which can then be e-filed.

During the preparation of a tax return for a taxpayer, a user (e.g. the taxpayer or a tax preparer) may enter tax data into the tax return preparation system, which then calculates the tax return using the tax calculation graph(s). The calculation of the tax calculation graph(s) results in a populated tax calculation graph with values at each of the nodes calculated in the tax calculation graph(s). For example, the calculated tax calculation graph(s) may include the total tax due, the amount of tax owed or amount of refund (the total tax due minus the amount paid by the taxpayer), as well as the results of all of the calculations required to determine these values. The user may then change one or more of the tax data for the taxpayer (change of tax data includes adding additional tax data, changing previously entered tax data, or otherwise changing the tax data used to calculate the tax return), which may or may not change the results of the calculated tax calculation graph(s), such as the tax. A user may want to know why the change in tax data changed, or did not change, the tax results, such as the amount of tax owed or amount of refund.

Accordingly, in one embodiment of the present invention, the tax preparation system comprises a change analysis engine configured to analyze and determine a change, or no change, in the results of a tax calculation caused by a change in taxpayer tax data. The system may also be configured to generate explanations of the reasons that a change in taxpayer tax data changed or did not change caused a change in the tax results, such as a change in the amount of tax owed or amount of refund. Accordingly, the change analysis engine is configured to access a first calculated tax calculation graph which is the result of calculating the tax calculation graph based on first tax data for the taxpayer. The first calculated tax calculation graph has a first calculated tax value for a first node of the tax calculation graph. For example, the first node may be the refund amount. The change analysis system also accesses a second calculated tax calculation graph calculated by the tax calculation engine which is the result of calculating the tax calculation graph based on second tax data for the taxpayer. The second tax data is different from the first tax data. For instance, the second tax data may have a different value for a tax input, or it may be additional tax data, such as a new W-2. The second calculated tax calculation graph has a second calculated tax value for the first node of the tax calculation graph. For example, the second calculated tax value for the first node may be a higher or lower refund amount than the first calculated tax value for the first node.

The change analysis engine is further configured to analyze the first tax data and second tax data to determine one or more differences between the first tax data and second tax data. The change analysis system also determines whether the first calculated tax value differs from the second calculated tax value. When the change analysis engine determines that the first calculated tax value differs from the second calculated tax value, then the change analysis engine analyzes the first calculated tax calculation graph and the second calculated tax calculation graph to determine one or more changed nodes on the tax calculation graph having values which differ between the first calculated tax calculation graph and the second tax calculation graph, other than the first node (which was already determined to differ).

In another aspect of the invention, the system may be configured to determine the one or more changed node(s) by traversing the first calculated tax calculation graph and the second calculated tax calculation graph and comparing the values for the respective calculated tax calculation graphs at corresponding nodes. This may be done node by node from the bottom-up through the tax calculation graph (e.g. starting at the first node), or from the top-down through the calculation graph (e.g. starting at a changed input node).

In an additional aspect of the invention, the tax preparation system may also be configured to use the changed nodes to generate an explanation of a reason that the first calculated tax value and the second calculated tax value differ. In one aspect, the nodes on the calculation graph, such as function nodes, functional nodes and tax operations, may be associated with explanation data (the term "explanation data" includes information which can be used to generate an explanation), regarding the respective node. For example, if the second tax data adds a new W-2 with additional income, then the system can determine that the changed nodes include the nodes for gross income, adjusted gross income, and tax owed, among others. The system is configured to generate an explanation of a reason for the difference in the first and second calculated tax values based on the changed nodes (e.g. using the explanation data associated with the changed nodes). As an example, the system may generate an explanation that the tax refund decreased from the first tax data to the second tax data because the adjusted gross income increased. The system may also be configured to generate multiple explanations, for example, explanations having different levels of explanatory detail. For instance, in the example above, a first level of detail may include simply an explanation that "the new W-2 increased the tax owed." A second level of detail may further include that "the new W-2 increased the gross income which increased the adjusted gross income." A third level of detail may further include that "the new W-2 increased adjusted gross income which increased the tax owed which decreased the tax refund." The system may be configured to display the additional explanations and/or level of detail to a user in response to a request or selection by the user, or automatically based on settings selected by the user, the product version of the tax preparation software being utilized (such as basic, standard, premium, etc.), payment of a fee, or other suitable parameters.

In a further aspect of the invention, the system may also be configured to analyze the situation in which the change in the taxpayer tax data does not change the tax result, such as the value of the first node, and to generate an explanation of a reason that there was no change. Hence, the change analysis engine is further configured such that when the change analysis engine determines there is no difference between the first calculated tax value and the second calculated tax value for the first node, then the change analysis engine analyzes the first calculated tax calculation graph and the second calculated tax calculation graph to determine one or more unchanged node(s) on the calculation graph having no difference in value between the first calculated tax calculation graph and the second calculated tax calculation graph along a calculation path connecting to an input node at which the value for the input node differs between the first calculated tax calculation graph and the second calculated tax calculation graph. This process identifies nodes on the tax calculation graph which depend on an input node which changed between the first and second taxpayer tax data, but the value of the identified nodes did not change as a result of the change in taxpayer tax data.

The tax preparation system may also be configured to generate an explanation of a reason there is no difference between the first calculated tax value and the second calculated tax value based upon the determination of the unchanged node(s). This is similar to generating an explanation of a reason that the first and second calculated tax value differ, except it is determining a reason that they do not differ.

In another aspect of the invention, the tax preparation system may utilize impact chains to determine changed and/or unchanged nodes between a first calculated tax calculation graph and a second calculated tax calculation graph. An impact chain is a sequence of interdependent nodes within a tax calculation graph. Accordingly, an impact chain for a respective node of a calculation graph consists of one of (a) each of the other nodes which are affected by the respective node (e.g. a top-down traverse of the calculation graph commencing with the respective node), or (b) each of the other nodes which affect the respective node (e.g. a bottom-up traverse of the calculation graph commencing with the respective node).

In yet another aspect of the invention, the tax preparation system may comprise an explanation engine for generating the explanations. The explanation engine may be a separate sub-system of the tax preparation system or it may be integrated with the change analysis system.

Another embodiment of the present invention is directed to computer-implemented methods for analyzing a change in the results of a tax calculation caused by a change in taxpayer tax data. For example, the method may include, a tax preparation system, same or similar to that described above, executing the tax calculation engine based on first tax data for the taxpayer resulting in a first calculated tax calculation graph, the first calculated tax calculation graph having a first calculated tax value for a first node of the tax calculation graph. The tax preparation system executes the tax calculation engine based on second tax data for the taxpayer, the second tax data different than the first tax data. This results in a second calculated tax calculation graph in which the second calculated tax calculation graph has a second calculated tax value for the first node of the tax calculation graph. Then, tax preparation system executes the change analysis engine. The change analysis engine determines whether the first calculated tax value differs from the second calculated tax value. When the change analysis engine determines a difference between the first and second calculated tax values, the change analysis engine analyzes the first calculated tax calculation graph and the second calculated tax calculation graph to determines one or more changed nodes on the tax calculation graph having values which differ between the first calculated tax calculation graph and the second tax calculation graph.

In additional aspects of the present invention, the computer-implemented method may also include any of the additional aspects described herein for the system for analyzing a change in the results of a tax calculation caused by a change in taxpayer tax data.

Another embodiment of the present invention is directed to an article of manufacture comprising a non-transitory computer readable medium embodying instructions executable by a computer to execute a process according to any of the method embodiments of the present invention for analyzing a change in the results of a tax calculation caused by a change in taxpayer tax data. For instance, the non-transitory computer readable medium embodying instructions executable by a computer may be configured to execute a process comprising: a tax preparation system, same or similar to that described above, executing the tax calculation engine based on first tax data for the taxpayer resulting in a first calculated tax calculation graph, the first calculated tax calculation graph having a first calculated tax value for a first node of the tax calculation graph. The tax preparation system executes the tax calculation engine based on second tax data for the taxpayer, the second tax data different than the first tax data. This results in a second calculated tax calculation graph in which the second calculated tax calculation graph has a second calculated tax value for the first node of the tax calculation graph. Then, the tax preparation system executes the change analysis engine. The change analysis engine determines whether the first calculated tax value differs from the second calculated tax value. When the change analysis engine determines a difference between the first and second calculated tax values, the change analysis engine analyzes the first calculated tax calculation graph and the second calculated tax calculation graph to determines one or more changed nodes on the tax calculation graph having values which differ between the first calculated tax calculation graph and the second tax calculation graph.

In additional aspects, the article of manufacture may be further configured according to the additional aspects described herein for the system and/or method for analyzing a change in the results of a tax calculation caused by a change in taxpayer tax data.

It is understood that the steps of the methods and processes of the present invention are not required to be performed in the order as shown in the figures or as described, but can be performed in any order that accomplishes the intended purpose of the methods and processes.

BRIEF DESCRIPTION OF THE DRAWINGS

FIG. 4 illustrates a decision table based on or derived from the completeness graph of FIG. 3.

FIG. 5 illustrates another embodiment of a decision table that incorporates statistical data.

DETAILED DESCRIPTION OF ILLUSTRATED EMBODIMENTS

Figure 1:
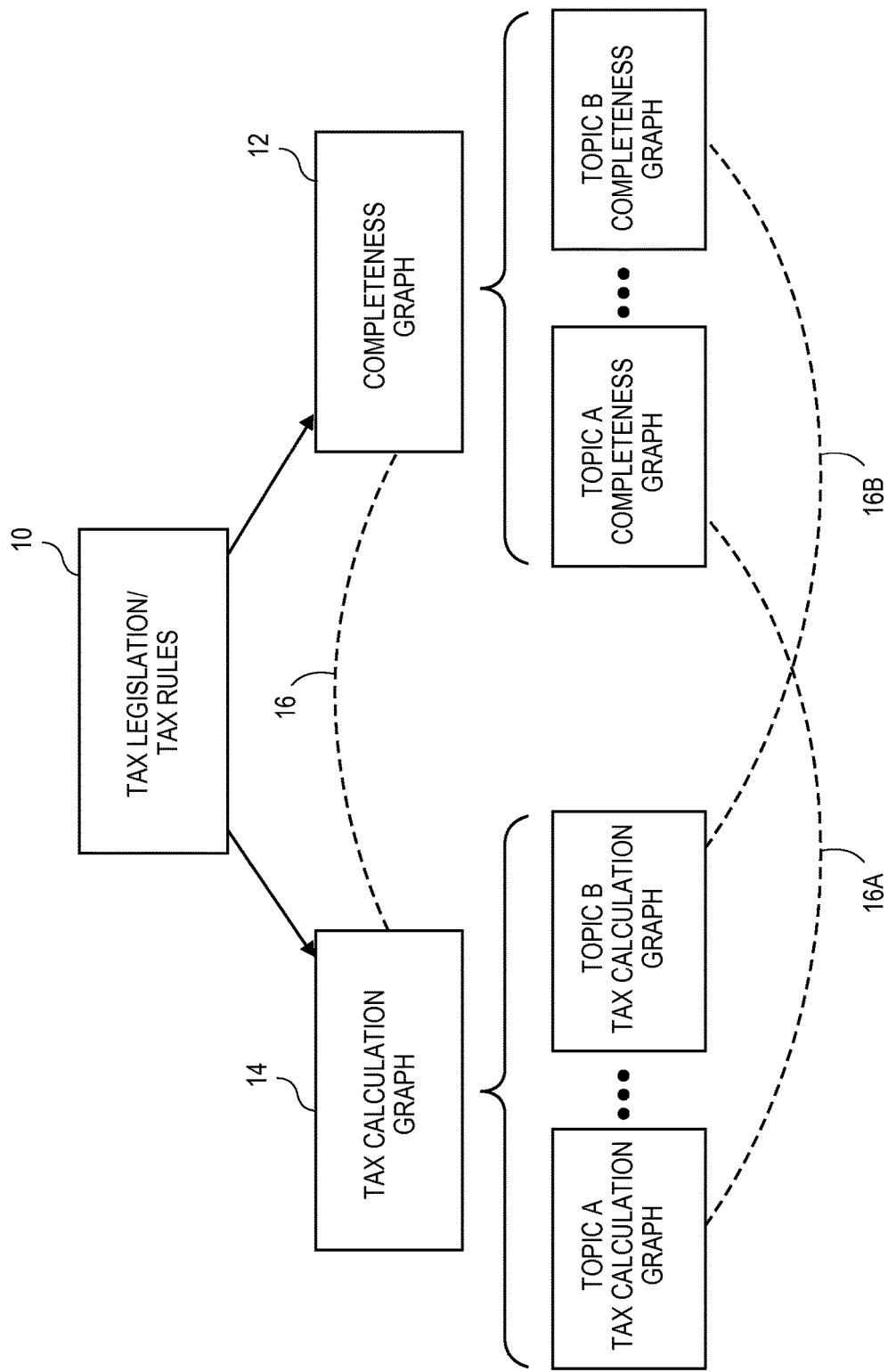
FIG. 1 schematically illustrates how tax legislation/tax rules are parsed and represented by a completeness graph and a tax calculation graph.

Embodiments of the present invention are directed to systems, methods and articles of manufacture for analyzing a change in the results of a tax calculation caused by a change in taxpayer tax data within a tax preparation system, and for generating explanations of reasons for the change in the results. During the process of preparing a tax return, a user (e.g. a taxpayer or a tax preparer) will enter tax data and will typically review preliminary results of the tax return, such as a tax refund amount (in the case of overpayment) or tax payable amount (in the case of underpayment). The user may then change the tax data and/or input additional new tax data, and the user may want to see how the changed and/or new tax data affected the tax result. Accordingly, the tax preparation system of the present invention comprises a change analysis engine configured to access and analyze first and second tax calculation graphs based on first tax data and different second tax data, respectively. The tax calculation engine then determines whether there are changes in the results of the first and second tax calculation, and analyzes and determines the changed node(s) on the tax calculation graph which are different between the first and second calculated tax calculation graphs (in the case in which the tax result changed), or the unchanged node(s) (in the case in which the tax result did not change). The change analysis engine may then use the determination of changed node(s) or the unchanged node(s) to generate an explanation as to the reason(s) that the tax results changed, or did not change, as the case may be.

Tax preparation is a time-consuming and laborious process. It is estimated that individuals and businesses spend around 6.1 billion hours per year complying with the filing requirements of the United States federal Internal Revenue Code. Tax return preparation software has been commercially available to assist taxpayers in preparing their tax returns. Tax return preparation software is typically run on a computing device such as a computer, laptop, tablet, or mobile computing device such as a Smartphone. Traditionally, a user has walked through a set of rigidly defined user interface interview screens that selectively ask questions that are relevant to a particular tax topic or data field needed to calculate a taxpayer's tax liability.

In contrast to the rigidly defined user interface screens used in prior iterations of tax preparation software, the present design provides tax preparation software 100 that runs on computing devices 102, 103 (see FIG. 10) and operates on a new construct in which tax rules and the calculations based thereon are established in declarative data-structures, namely, completeness graph(s) and tax calculation graph(s). Completeness graphs 12 (see e.g. FIGS. 1-3) and tax calculation graphs 14 (see e.g. FIGS. 6A-6D) are data structures in the form of trees having nodes and interconnections between the nodes indicating interdependencies. Completeness graphs 12 identify each of the conditions (e.g. questions, criteria, conditions) which may be required to be satisfied to complete a particular tax topic or a complete tax return, and also identifies when all conditions have been satisfied to complete a particular tax topic or, a complete, file-able tax return. The tax calculation graphs 14 semantically describe data dependent nodes, including input nodes, functional nodes, functions, and tax operations, that perform tax calculations or operations in accordance with tax code or tax rules. Examples of these data structures are described in U.S. patent application Ser. Nos. 14/097,057 and 14/448,886, both of which are incorporated by reference as if set forth fully herein.

Use of these data-structures permits the user interface to be loosely connected or even detached from the tax calculation engine and the data used in the tax calculations. Tax calculations are dynamically calculated based on tax data derived from sourced data, estimates, user input, or even intermediate tax calculations that are then utilized for additional tax calculations. A smart tax logic agent running on a set of rules can review current run time data and evaluate missing data fields and propose suggested questions to be asked to a user to fill in missing blanks. This process can be continued until completeness of all tax topics has occurred. An electronic return can then be prepared and filed with respect to the relevant taxing jurisdictions.

FIG. 1 illustrates graphically how tax legislation/tax rules 10 are broken down into a completeness graph 12 and a tax calculation graph 14. In one aspect of the invention, tax legislation or rules 10 are parsed or broken into various topics. For example, there may be nearly one hundred topics that need to be covered for completing a federal tax return. When one considers both federal and state tax returns, there can be well over one hundred tax topics that need to be covered. When tax legislation or tax rules 10 are broken into various topics or sub-topics, in one embodiment of the invention, each particular topic (e.g., topics A, B) may each have their own dedicated completeness graph 12A, 12B and tax calculation graph 14A, 14B as seen in FIG. 1.

Note that in FIG. 1, the completeness graph 12 and the tax calculation graph 14 are interdependent as illustrated by dashed line 16. That is to say, some elements contained within the completeness graph 12 are needed to perform actual tax calculations using the tax calculation graph 14. Likewise, aspects within the tax calculation graph 14 may be needed as part of the completion graph 12. Taken collectively, the completeness graph 12 and the tax calculation graph 14 represent data structures that capture all the conditions necessary to complete the computations that are required to complete a tax return that can be filed. The completeness graph 12, for example, determines when all conditions have been satisfied such that a "fileable" tax return can be prepared with the existing data. The completeness graph 12 is used to determine, for example, that no additional data input is needed to prepare and ultimately print or file a tax return. The completeness graph 12 is used to determine when a particular schema contains sufficient information such that a tax return can be prepared and filed. Individual combinations of completeness graphs 12 and tax calculation graphs 14 that relate to one or more topics can be used to complete the computations required for some sub-calculation. In the context of a tax setting, for example, a sub-selection of topical completeness graphs 12 and tax calculation graphs 14 can be used for intermediate tax results such as Adjusted Gross Income (AGI) or Taxable Income (TI), itemized deductions, tax credits, and the like.

Figure 2:
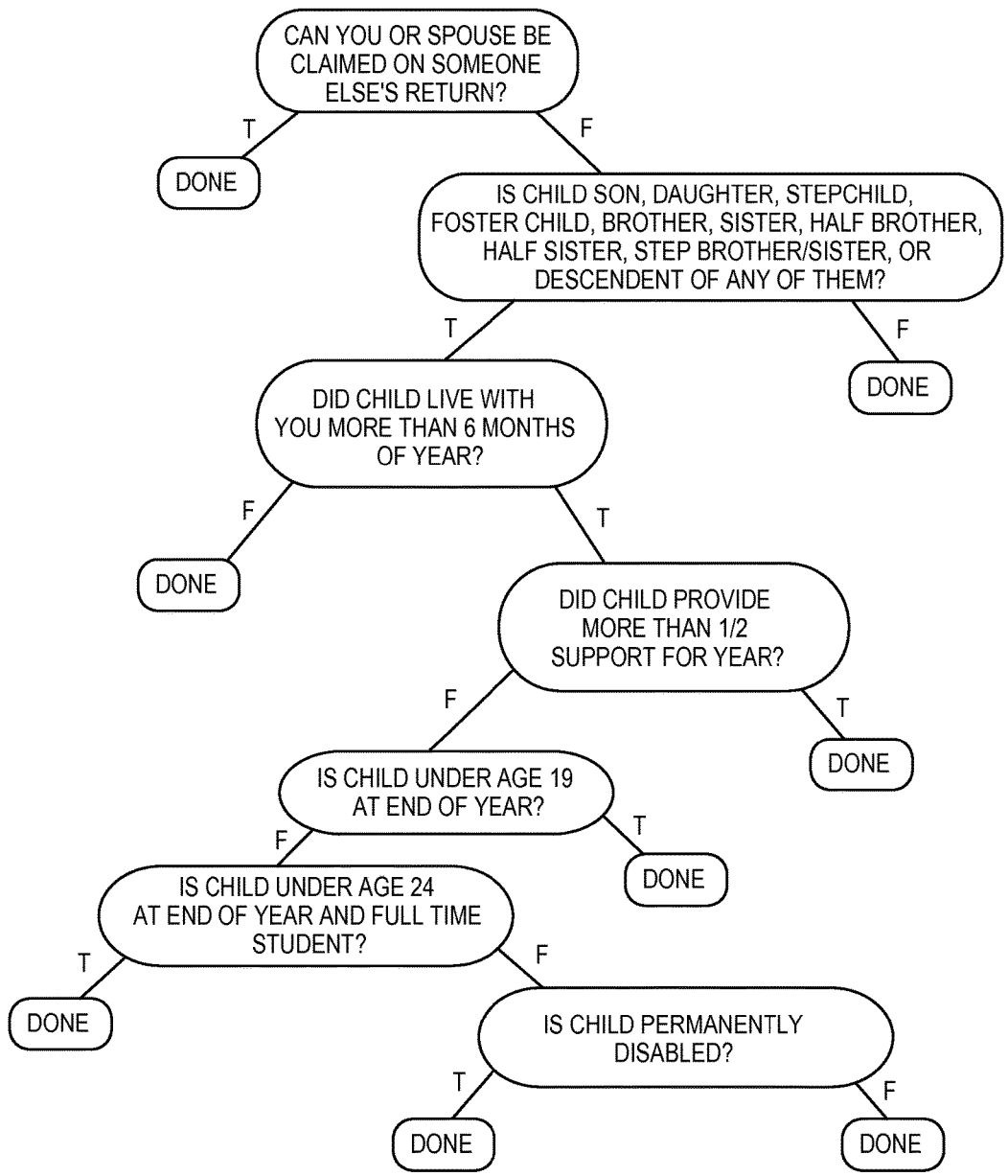
FIG. 2 illustrates an example of a simplified version of a completeness graph related to a qualifying child for purposes of determining deductions for federal income tax purposes.

The completeness graph 12 and the tax calculation graph 14 represent data structures that can be constructed in the form of a tree. FIG. 2 illustrates a completeness graph 12 in the form of a tree with nodes 20 and arcs 22 representing a basic or general version of a completeness graph 12 for the topic of determining whether a child qualifies as a dependent for federal income tax purposes. A more complete flow chart-based representation of questions related to determining a "qualified child" may be found in U.S. patent application Ser. No. 14/097,057, which is incorporated by reference herein. Each node 20 contains a condition that in this example is expressed as a Boolean expression that can be answered in the affirmative or negative. The arcs 22 that connect each node 20 illustrate the dependencies between nodes 20. The combination of arcs 22 in the completeness graph 12 illustrates the various pathways to completion. A single arc 22 or combination of arcs 22 that result in a determination of "Done" represent a pathway to completion. As seen in FIG. 2, there are several pathways to completion. For example, one pathway to completion is where an affirmative (True) answer is given to the question of whether you or a spouse can be claimed on someone else's tax return. If such a condition is true, your child is not a qualifying dependent because under IRS rules you cannot claim any dependents if someone else can claim you as a dependent. In another example, if you had a child and that child did not live with you for more than 6 months of the year, then your child is not a qualifying dependent. Again, this is a separate IRS requirement for a qualified dependent.

As one can imagine given the complexities and nuances of the tax code, many tax topics may contain completeness graphs 12 that have many nodes with a large number of pathways to completion. However, many branches or lines within the completeness graph 12 can be ignored, for example, when certain questions internal to the completeness graph 12 are answered that eliminate other nodes 20 and arcs 22 within the completeness graph 12. The dependent logic expressed by the completeness graph 12 allows one to minimize subsequent questions based on answers given to prior questions. This allows a minimum question set that can be generated and that can be presented to a user as explained herein.

Figure 3:
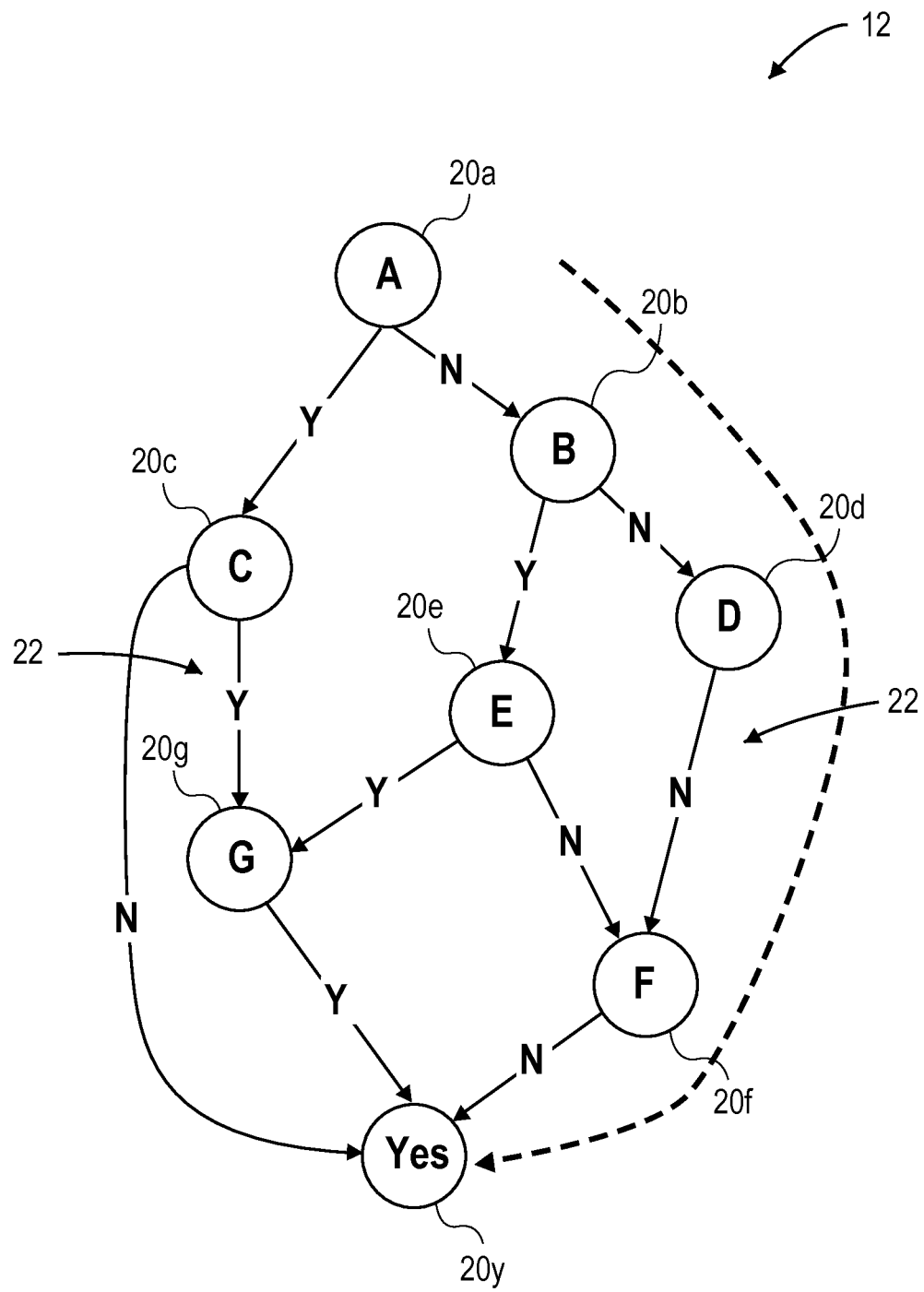
FIG. 3 illustrates another illustration of a completeness graph.

FIG. 3 illustrates another example of a completeness graph 12 that includes a beginning node 20a (Node A), intermediate nodes 20b-g (Nodes B-G) and a termination node 20y (Node "Yes" or "Done"). Each of the beginning node 20a and intermediate nodes 20a-g represents a question. Inter-node connections or arcs 22 represent response options. In the illustrated embodiment, each inter-node connection 22 represents an answer or response option in binary form (Y/N), for instance, a response to a Boolean expression. It will be understood, however, that embodiments are not so limited, and that a binary response form is provided as a non-limiting example. In the illustrated example, certain nodes, such as nodes A, B and E, have two response options 22, whereas other nodes, such as nodes D, G and F, have one response option 22.

As explained herein, the directed graph or completion graph 12 that is illustrated in FIG. 3 can be traversed through all possible paths from the start node 20a to the termination node 20y. By navigating various paths through the completion graph 12 in a recursive manner, the system can determine each path from the beginning node 20a to the termination node 20y. The completion graph 12 along with the pathways to completion through the graph can be converted into a different data structure or format. In the illustrated embodiment shown in FIG. 4, this different data structure or format is in the form of a decision table 30. In the illustrated example, the decision table 30 includes rows 32 (five rows 32a-e are illustrated) based on the paths through the completion graph 12. In the illustrated embodiment, the columns 34a-g of the completion graph represent expressions for each of the questions (represented as nodes A-G in FIG. 3) and answers derived from completion paths through the completion graph 12 and column 34h indicates a conclusion, determination, result or goal 34h concerning a tax topic or situation, e.g., "Yes—your child is a qualifying child" or "No—your child is not a qualifying child."

Referring to FIG. 4, each row 32 of the decision table 30 represents a tax rule. The decision table 30, for example, may be associated with a federal tax rule or a state tax rule. In some instances, for example, a state tax rule may include the same decision table 30 as the federal tax rule. The decision table 30 can be used, as explained herein, to drive a personalized interview process for the user of tax preparation software 100. In particular, the decision table 30 is used to select a question or questions to present to a user during an interview process. In this particular example, in the context of the completion graph from FIG. 3 converted into the decision table 30 of FIG. 4, if the first question presented to the user during an interview process is question "A" and the user answers "Yes" rows 32c-e may be eliminated from consideration given that no pathway to completion is possible. The tax rule associated with these columns cannot be satisfied given the input of "Yes" in question "A." Note that those cell entries denoted by "?" represent those answers to a particular question in a node that are irrelevant to the particular pathway to completion. Thus, for example, referring to row 34a, when an answer to $Q_A$ is "Y" and a path is completed through the completion graph 12 by answering Question C as "N" then answers to the other questions in Nodes B and D-F are "?" since they are not needed to be answered given that particular path.

After an initial question has been presented and rows are eliminated as a result of the selection, next, a collection of candidate questions from the remaining available rows 32a and 32b is determined. From this universe of candidate questions from the remaining rows, a candidate question is selected. In this case, the candidate questions are questions $Q_C$ and $Q_G$ in columns 34c, 34g, respectively. One of these questions is selected and the process repeats until either the goal 34h is reached or there is an empty candidate list.

FIG. 5 illustrates another embodiment of a decision table 30. In this embodiment, the decision table 30 includes additional statistical data 36 associated with each rule (e.g., rules $R_1$-$R_6$). For example, the statistical data 36 may represent a percentage or the like in which a particular demographic or category of user(s) satisfies this particular path to completion. The statistical data 36 may be mined from existing or current year tax filings. The statistical data 36 may be obtained from a proprietary source of data such as tax filing data owned by Intuit, Inc. The statistical data 36 may be third party data that can be purchased or leased for use. For example, the statistical data 36 may be obtained from a government taxing authority or the like (e.g., IRS). In one aspect, the statistical data 36 does not necessarily relate specifically to the individual or individuals preparing the particular tax return. For example, the statistical data 36 may be obtained based on a number of tax filers which is then classified into one or more classifications. For example, statistical data 36 can be organized with respect to age, type of tax filing (e.g., joint, separate, married filing separately), income range (gross, AGI, or TI), deduction type, geographic location, and the like).

FIG. 5 illustrates two such columns 38a, 38b in the decision table 30 that contain statistical data 36 in the form of percentages. For example, column 38a (STAT1) may contain a percentage value that indicates taxpayers under the age of thirty-five where $Rule_1$ is satisfied. Column 38b (STAT2) may contain a percentage value that indicates taxpayers over the age of thirty-five where $Rule_1$ is satisfied. Any number of additional columns 38 could be added to the decision table 30 and the statistics do not have to relate to an age threshold or grouping. The statistical data 36 may be used, as explained in more detail below, by the tax preparation software 100 to determine which of the candidate questions ($Q_A$-$Q_G$) should be asked to a taxpayer. The statistical data 36 may be compared to one or more known taxpayer data fields (e.g., age, income level, tax filing status, geographic location, or the like) such that the question that is presented to the user is most likely to lead to a path to completion. Candidate questions may also be excluded or grouped together and then presented to the user to efficiently minimize tax interview questions during the data acquisition process. For example, questions that are likely to be answered in the negative can be grouped together and presented to the user in a grouping and asked in the negative—for example, "we think these question do not apply to you, please confirm that this is correct." This enables the elimination of many pathways to completion that can optimize additional data requests of the taxpayer.

Figure 6A:
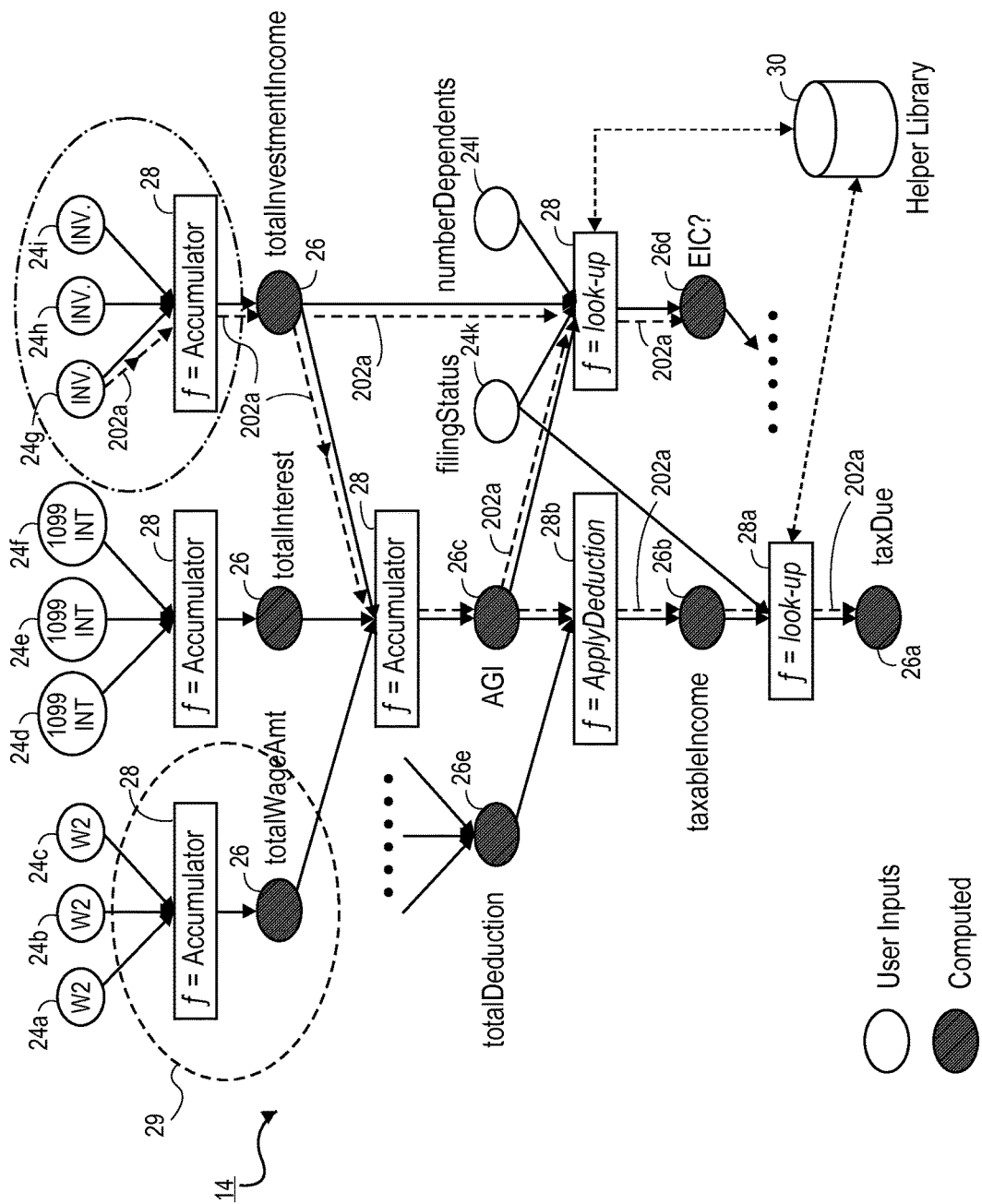
FIG. 6A illustrates an example of a calculation graph and impact chain according to one embodiment.

FIG. 6A illustrates an example of a tax calculation graph 14. The tax calculation graph 14 semantically describes data dependent tax operations that are used to perform a tax calculation in accordance with the tax code or tax rules 10. The tax calculation graph 14 in FIG. 6A is a simplified view of data dependent tax operations that are used to determine the taxes Due (taxDue) based on various sources of income, deductions, exemptions, and credits. The tax calculation graph 14 is a type of directed graph (which may be composed of a plurality of directed graphs) and, in most situations relevant to tax calculations, is a directed acyclic graph that encodes the data dependencies amongst tax concepts or topics.

In FIG. 6A, various nodes 24 are leaf or input nodes. Examples of leaf nodes 24 in this particular example include data obtained from W-2 forms, data obtained from 1099-INT forms, data obtained from other investment income (INV), filing status, and number of dependents. Typically, though not exclusively, leaf nodes 24 are populated with user inputs. That is to say the user (e.g. a taxpayer) will enter this information from a user interface as described herein. In other embodiments, however, the leaf nodes 24 may be populated with information that is automatically obtained by the tax preparation software 100. For example, in some embodiments, tax documents may be imaged or scanned with relevant data being automatically extracted using Object Character Recognition (OCR) techniques. In other embodiments, prior tax returns may be used by the tax preparation software 100 to extract information (e.g., name, potential dependents, address, and social security number) which can then be used to populate the leaf nodes 24. Online resources such as financial services websites or other user-specific websites can be crawled and scanned to scrape or otherwise download tax related information that can be automatically populated into leaf nodes 24. Additional third party information sources such as credit bureaus, government databases, and the like can also be used by the tax preparation software 100 to obtain information that can then be populated in to respective leaf nodes 24.

In still other embodiments, values for leaf nodes 24 may be derived or otherwise calculated. For example, while the number of dependents may be manually entered by a taxpayer, those dependents may not all be "qualifying" dependents for tax purposes. In such instances, the actual number of "qualified" dependents may be derived or calculated by the tax preparation software 100. In still other embodiments, values for leaf nodes 24 may be estimated as described herein.

Still other internal nodes, referred to as functional nodes 26, semantically represent a tax concept and may be calculated or otherwise determined using a function node 28 (also referred to as a "function 28"). The functional node 26 and the associated function 28 define a particular tax operation 29. For example, as seen in FIG. 6A, tax operation 29 refers to total wage income and is the result of the accumulator function 28 summing all W-2 income from leaf nodes 24. The functional node 26 may include a number in some instances. In other instances, the functional node 26 may include a response to a Boolean expression such as "true" or "false." The functional nodes 26 may also be constant values in some instances. Some or all of these functional nodes 26 may be labeled as "tax concepts" or "tax topics." The combination of a functional node 26 and its associated function 28 relate to a specific tax operation 29 as part of the tax topic.

Interconnected functional node 26 containing data dependent tax concepts or topics are associated with a discrete set of functions 28 that are used to capture domain specific patterns and semantic abstractions used in the tax calculation. The discrete set of functions 28 that are associated with any particular functional node may be commonly re-occurring operations for functions that are used throughout the process of calculating tax liability. For instance, examples of such commonly reoccurring functions 28 include copy, capping, thresholding, accumulation or adding, look-up operations, phase out calculations, comparison calculations, exemptions, exclusions, and the like.

In one embodiment, the entire set of functions 28 that is used to compute or calculate a tax liability is stored within a data store 30 which in some instances may be a database. The various functions 28 that are used to semantically describe data connections between functional nodes 26 can be called upon by the tax preparation software 100 for performing tax calculations. Utilizing these common functions 28 greatly improves the efficiency of the tax preparation software 100 and can be used by a programmer to more easily track and follow the complex nature of the ever-evolving tax code. The common functions 28 also enable easier updating of the tax preparation software 100 because as tax laws and regulations change, fewer changes need to be made to the software code as compared to prior hard-wired approaches.

Importantly, the tax calculation graph 14 and the associated functional nodes 26 and function nodes 28 can be tagged and later be used or called upon to intelligently explain to the user the reasoning behind why a particular tax result changed or did not change between a first set of tax data and a second set of tax data having one or more different values, as explained in more detail below. The functions 28 can be de-coupled from a specific narrow definition and instead be associated with one or more explanations. Examples of common functions 28 found in tax legislation and tax rules include the concepts of "caps" or "exemptions" that are found in various portions of the tax code. One example of a "cap" is the portion of the U.S. tax code that limits the ability of a joint filer to deduct more than $3,000 of net capital losses in any single tax year. There are many other instances of such caps. An example of an "exemption" is one that relates to early distributions from retirement plans. For most retirement plans, early distributions from qualified retirement plans prior to reaching the age of fifty nine and one-half (59½) require a 10% penalty. This penalty can be avoided, however, if an exemption applies such as the total and permanent disability of the participant. Other exemptions also apply. Such exemptions are found throughout various aspects of the tax code and tax regulations.

In some embodiments, the function node 28 may include any number of mathematical or other operations. Examples of functions 28 include summation, subtraction, multiplication, division, and look-ups of tables or values from a database 30 or library as is illustrated in FIG. 6A. It should be understood that the functional node 26 within completion graph 12 and the tax calculation graph 14 may be shared in some instances. For example, AGI is a re-occurring tax concept that occurs in many places in the tax code. AGI is used not only for the mathematical computation of taxes but is also used, for example, to determine eligibility of certain tax deductions and credits. Thus, the AGI node is common to both the completion graph 12 and the tax calculation graph 14.

Figure 6B:
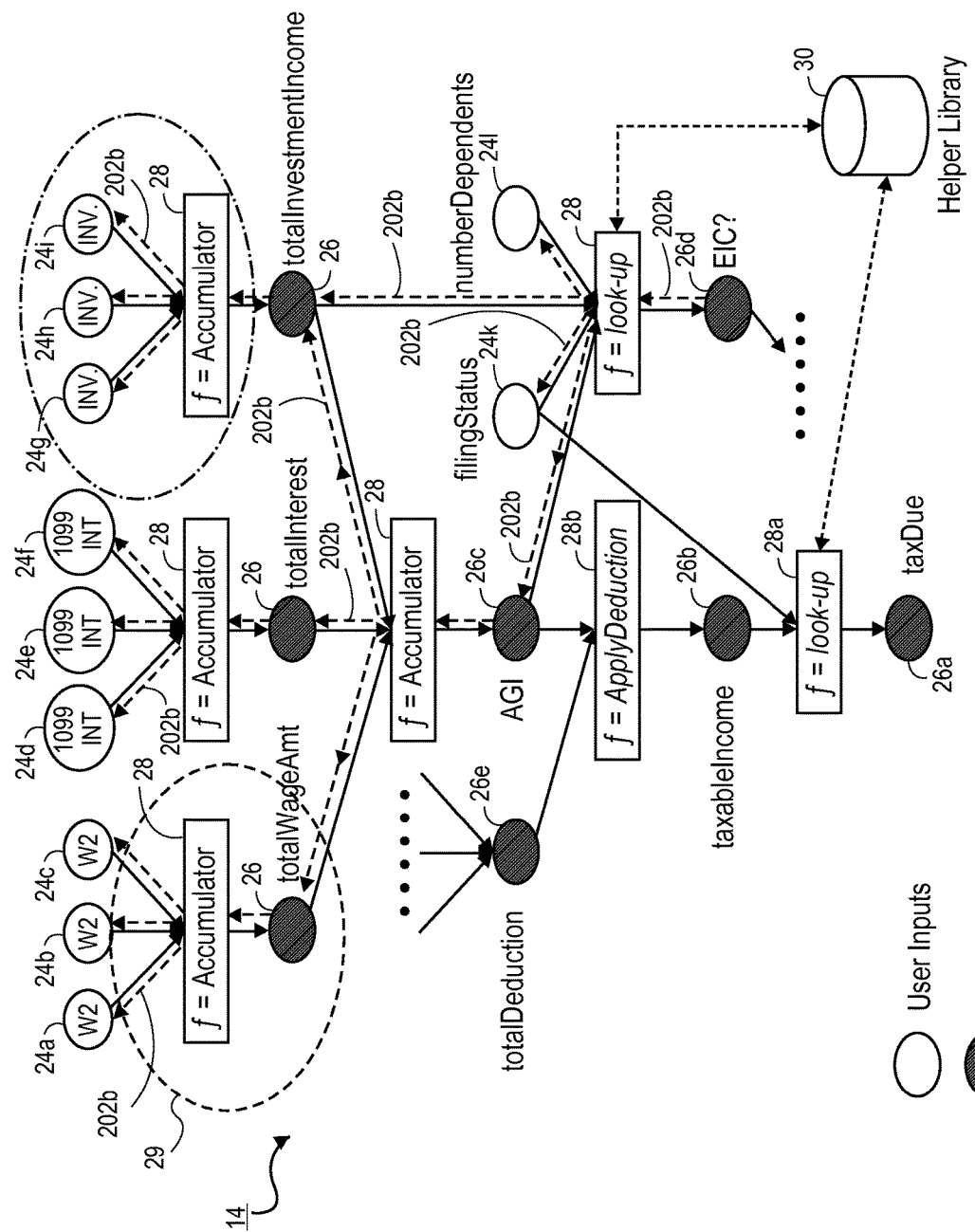
FIG. 6B illustrates an example of a calculation graph and impact chain according to one embodiment.

FIG. 6B is the same tax calculation graph as FIG. 6A, except it shows a different impact chain 202, as described in detail below.

Figure 7:
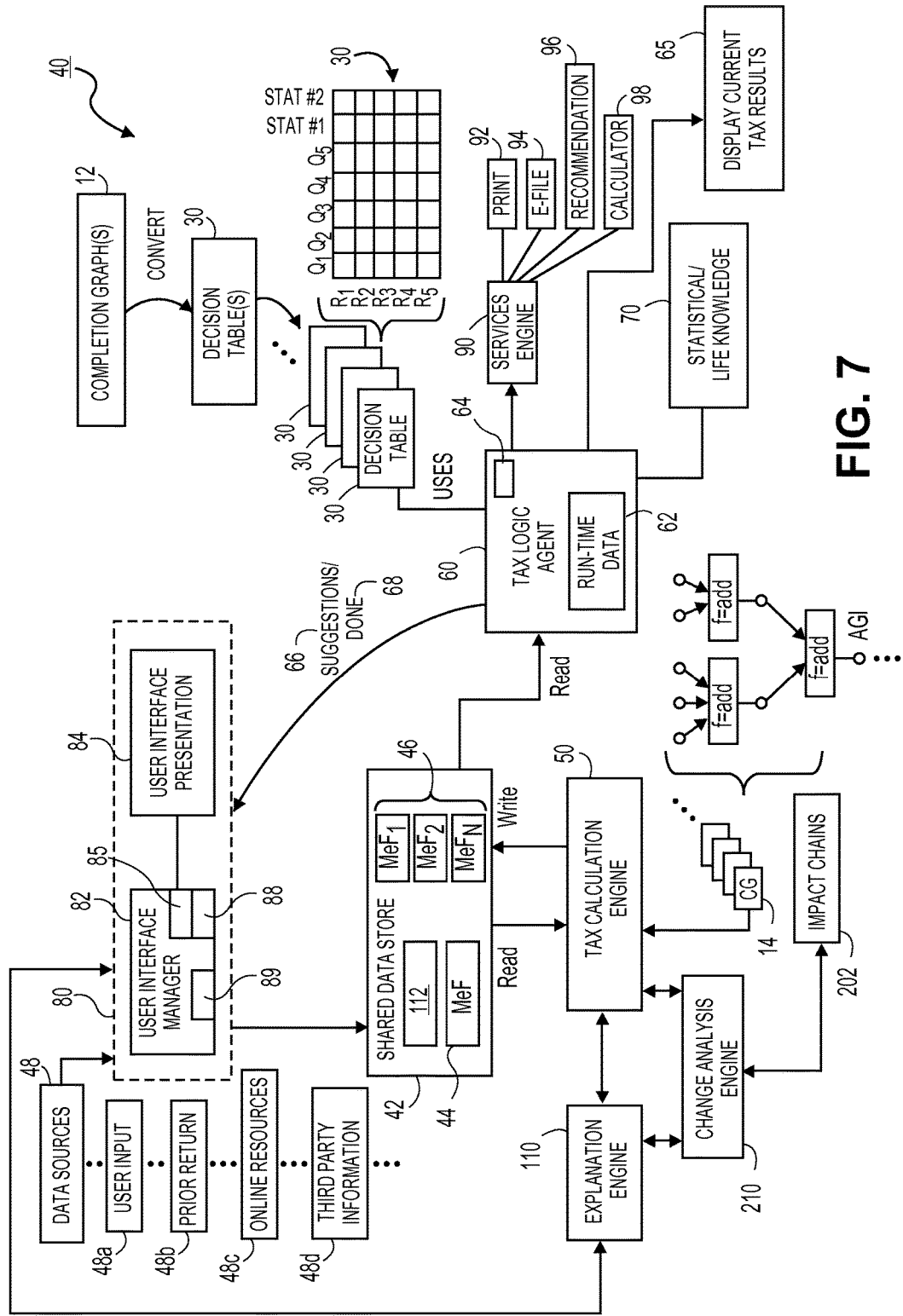
FIG. 7 schematically illustrates a tax preparation system for calculating taxes using rules and calculations based on declarative data structures, and performing a tax comparison function using different sets of tax data, according to one embodiment.

FIG. 7 schematically illustrates a tax return preparation system 40 for calculating taxes using rules and calculations based on declarative data structures according to one embodiment. The system 40 includes a shared data store 42 that contains therein a schema 44 or canonical model representative to the data fields utilized or otherwise required to complete a tax return. The shared data store 42 may be a repository, file, or database that is used to contain the tax-related data fields. The shared data store 42 is accessible by a computing device 102, 103 as described herein (e.g., FIG. 10). The shared data store 42 may be located on the computing device 102, 103 running the tax preparation software 100 or it may be located remotely, for example, in cloud environment on another, remotely located computer. The schema 44 may include, for example, a schema based on the Modernized e-File (MeF) system developed by the Internal Revenue Service. The MeF is a web-based system that allows electronic filing of tax returns through the Internet. MeF uses extensible markup language (XML) format that is used when identifying, storing, and transmitting data. For example, each line or data element on a tax return is given an XML name tag as well as every instance of supporting data. Tax preparation software 100 uses XML schemas and business rules to electronically prepare and transmit tax returns to tax reporting agencies. Transmitters use the Internet to transmit electronic tax return data to the IRS MeF system. The IRS validates the transmitted files against the XML schemas and Business Rules in the MeF schema 44. The schema 44 may be a modified version of the MeF schema used by the IRS. For example, the schema 44 may be an extended or expanded version (designated MeF++) of the MeF model established by government authorities that utilizes additional fields. While the particular MeF schema 44 is discussed herein, the invention is not so limited. MeF and MeF+++ are only examples of tax agency standards for electronic filing of tax returns, and the present invention is not limited to any particular standard. Accordingly, any references to MeF or MeF++ in the specification or drawings includes any suitable standard for electronic filing of tax returns.

There may be many different schemas 44 depending on the different tax jurisdiction. For example, Country A may have a tax schema 44 that varies from Country B. Different regions or states within a single country may even have different schemas 44. The systems and methods described herein are not limited to a particular schema 44 implementation. The schema 44 may contain all the data fields required to prepare and file a tax return with a government taxing authority. This may include, for example, all fields required for any tax forms, schedules, and the like. Data may include text, numbers, and a response to a Boolean expression (e.g., True/False or Yes/No). As explained in more detail, the shared data store 42 may, at any one time, have a particular instance 46 of the MeF schema 44 (for MeF++ schema) stored therein at any particular time. For example, FIG. 7 illustrates several instances 46 of the MeF schema 44 (labeled as $MeF_1$, $MeF_2$, $MeF_N$). These instances 46 may be updated as additional data is input into the shared data store 42.

As seen in FIG. 7, the shared data store 42 may import data from one or more data sources 48. A number of data sources 48 may be used to import or otherwise transfer tax related data to the shared data store 42. This may occur through a user interface control 80 as described herein or, alternatively, data importation may occur directly to the shared data store 42 (not illustrated in FIG. 7). The tax related data may include personal identification data such as a name, address, or taxpayer ID. Tax data may also relate to, for example, details regarding a taxpayer's employer(s) during a preceding tax year. This may include, employer name, employer federal ID, dates of employment, and the like. Tax related day may include residential history data (e.g., location of residence(s) in tax reporting period (state, county, city, etc.) as well as type of housing (e.g., rental unit or purchased home). Tax related information may also include dependent-related information such as the number of family members in a household including children. Tax related information may pertain to sources of income, including both earned and unearned income as well. Tax related information also include information that pertains to tax deductions or tax credits. Tax related information may also pertain to medical insurance information. For example, under the new ACA many taxpayers may obtain health insurance through a state or federal marketplace. Such a marketplace may have information stored or accessible that is used in connection with preparing a tax return. Tax information related to premiums paid, coverage information, subsidy amounts (if any), and enrolled individuals can be automatically imported into the shared data store 42.

For example, user input 48a is one type of data source 48. User input 48a may take a number of different forms. For example, user input 48a may be generated by a user using, for example, an input device such as keyboard, mouse, touchscreen display, voice input (e.g., voice to text feature), photograph or image, or the like to enter information manually into the tax preparation software 100. For example, as illustrated in FIG. 7, user interface manager 82 contains an import module 89 that may be used to select what data sources 48 are automatically searched for tax related data. Import module 89 may be used as a permission manager that includes, for example, user account numbers and related passwords. The UI control 80 enables what sources 48 of data are searched or otherwise analyzed for tax related data. For example, a user may select prior year tax returns 48b to be searched but not online resources 48c. The tax data may flow through the UI control 80 directly as illustrated in FIG. 7 or, alternatively, the tax data may be routed directly to the shared data store 42. The import module 89 may also present prompts or questions to the user via a user interface presentation 84 generated by the user interface manager 82. For example, a question may ask the user to confirm the accuracy of the data. For instance, the user may be asked to click a button, graphic, icon, box or the like to confirm the accuracy of the data prior to or after the data being directed to the shared data store 42. Conversely, the interface manager 82 may assume the accuracy of the data and ask the user to click a button, graphic, icon, box or the like for data that is not accurate. The user may also be given the option of whether or not to import the data from the data sources 48.

User input 48a may also include some form of automatic data gathering. For example, a user may scan or take a photographic image of a tax document (e.g., W-2 or 1099) that is then processed by the tax preparation software 100 to extract relevant data fields that are then automatically transferred and stored within the data store 42. OCR techniques along with pre-stored templates of tax reporting forms may be called upon to extract relevant data from the scanned or photographic images whereupon the data is then transferred to the shared data store 42.

Another example of a data source 48 is a prior year tax return 48b. A prior year tax return 48b that is stored electronically can be searched and data is copied and transferred to the shared data store 42. The prior year tax return 48b may be in a proprietary format (e.g., .txf, .pdf) or an open source format. The prior year tax return 48b may also be in a paper or hardcopy format that can be scanned or imaged whereby data is extracted and transferred to the shared data store 42. In another embodiment, a prior year tax return 48b may be obtained by accessing a government database (e.g., IRS records).

An additional example of a data source 48 is an online resource 48c. An online resource 48c may include, for example, websites for the taxpayer(s) that contain tax-related information. For example, financial service providers such as banks, credit unions, brokerages, investment advisors typically provide online access for their customers to view holdings, balances, and transactions. Financial service providers also typically provide year-end tax documents to their customers such as, for instance, 1099-INT (interest income), 1099-DIV (dividend income), 1099-B (brokerage proceeds), 1098 (mortgage interest) forms. The data contained on these tax forms may be captured and transferred electronically to the shared data store 42.

Of course, there are additional examples of online resources 48c beyond financial service providers. For example, many taxpayers may have social media or similar accounts. These include, by way of illustration and not limitation, Facebook, Linked-In, Twitter, and the like. User's may post or store personal information on these properties that may have tax implications. For example, a user's Linked-In account may indicate that a person changed jobs during a tax year. Likewise, a posting on Facebook about a new home may suggest that a person has purchased a home, moved to a new location, changed jobs; all of which may have possible tax ramifications. This information is then acquired and transferred to the shared data store 42, which can be used to drive or shape the interview process described herein. For instance, using the example above, a person may be asked a question whether or not she changed jobs during the year (e.g., "It looks like you changed jobs during the past year, is this correct?". Additional follow-up questions can then be presented to the user.

Still referring to FIG. 7, another data source 48 includes sources of third party information 48d that may be accessed and retrieved. For example, credit reporting bureaus contain a rich source of data that may implicate one or more tax items. For example, credit reporting bureaus may show that a taxpayer has taken out a student loan or home mortgage loan that may be the source of possible tax deductions for the taxpayer. Other examples of sources of third party information 48d include government databases. For example, the state department of motor vehicles may contain information relevant to tax portion of vehicle registration fees which can be deductible in some instances. Other government databases that may be accessed include the IRS (e.g., IRS tax return transcripts), and state taxing authorities. Third party resources 48d may also include one of the state-based health insurance exchanges or the federal health insurance exchange (e.g., www.healthcare.gov).

Figure 10:
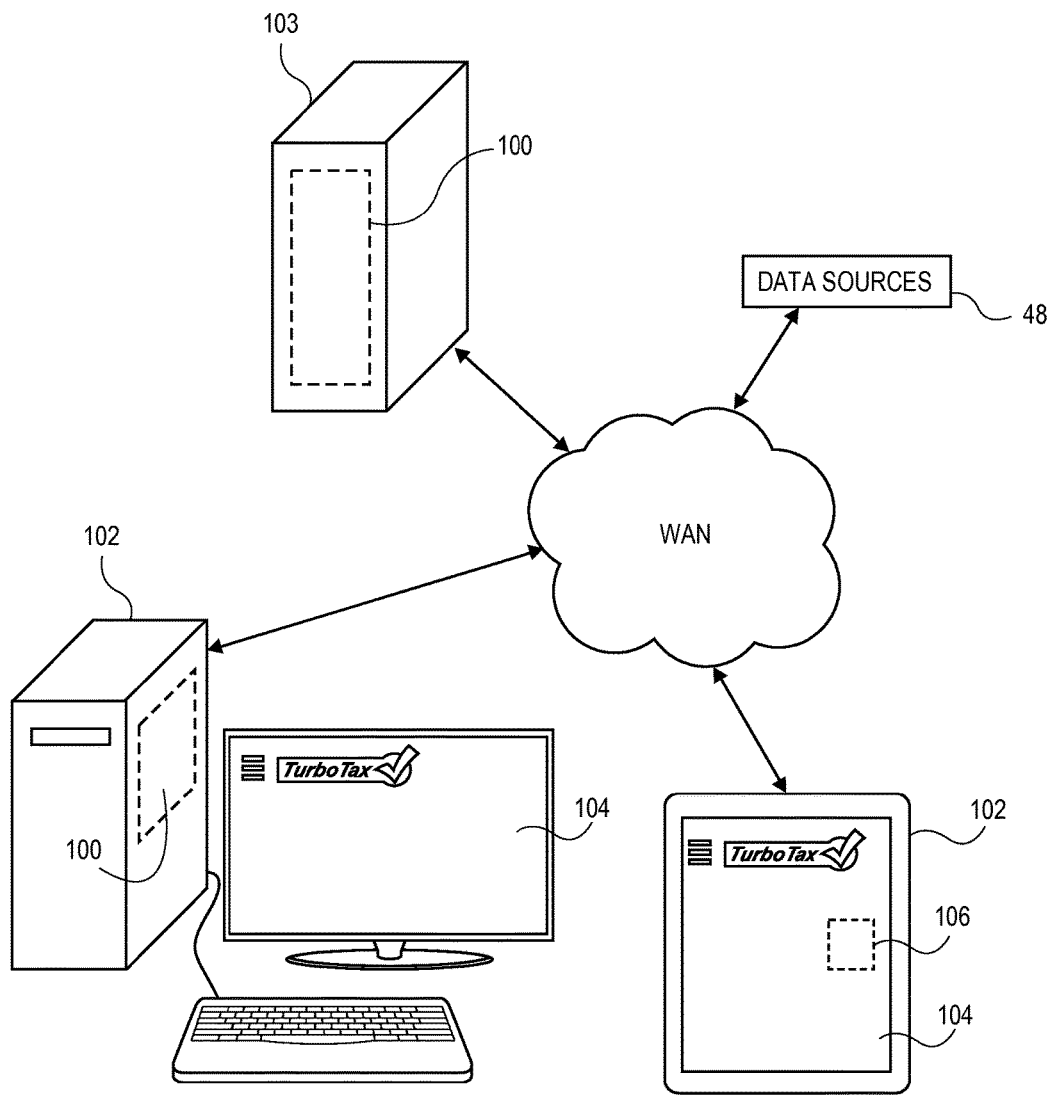
FIG. 10 illustrates the implementation of tax preparation software on various computing devices.

Referring briefly to FIG. 10, the tax preparation software 100 including the system 40 of FIG. 7 is executed by the computing device 102, 103. Referring back to FIG. 7, the tax return preparation software 100 executed by the computing device 102, 103 includes a tax calculation engine 50 that computes one or more tax calculations based on the tax calculation graph(s) 14 and the available data at any given instance within the schema 44 in the shared data store 42. The tax calculation engine 50 may calculate a final tax due amount, a final refund amount, or one or more intermediary calculations (e.g., taxable income, AGI, earned income, un-earned income, total deductions, total credits, alternative minimum tax (AMT) and the like). The tax calculation engine 50 utilizes the one or more calculation graphs 14 as described previously in the context of FIGS. 1, 6A and 6B. In one embodiment, a series of different calculation graphs 14 are used for respective tax topics. These different calculation graphs 14 may be coupled together or otherwise compiled as a composite calculation graph 14 to obtain an amount of taxes due or a refund amount based on the information contained in the shared data store 42. The tax calculation engine 50 reads the most current or up to date information contained within the shared data store 42 and then performs tax calculations. Updated tax calculation values are then written back to the shared data store 42. As the updated tax calculation values are written back, new instances 46 of the canonical model 46 are created. The tax calculations performed by the tax calculation engine 50 may include the calculation of an overall tax liability or refund due. The tax calculations may also include intermediate calculations used to determine an overall tax liability or refund due (e.g., AGI calculation). Tax calculations include, for example, the ACA penalty that is described in FIG. 6B as one illustrative example.

Still referring to FIG. 7, the system 40 includes a tax logic agent (TLA) 60. The TLA 60 operates in conjunction with the shared data store 42 whereby updated tax data represented by instances 46 are read to the TLA 60. The TLA 60 contains run time data 62 that is read from the shared data store 42. The run time data 62 represents the instantiated representation of the canonical tax schema 44 at runtime. The TLA 60 may contain therein a rule engine 64 that utilizes a fact cache to generate either non-binding suggestions 66 for additional question(s) to present to a user or "Done" instructions 68 which indicate that completeness has occurred and additional input is not needed. The rule engine 64 may operate in the form of a Drools expert engine. Other declarative rules engines 64 may be utilized and a Drools expert rule engine 64 is provided as one example of how embodiments may be implemented. The TLA 60 may be implemented as a dedicated module contained within the tax preparation software 100.

As seen in FIG. 7, the TLA 60 uses the decision tables 30 to analyze the run time data 62 and determine whether a tax return is complete. Each decision table 30 created for each topic or sub-topic is scanned or otherwise analyzed to determine completeness for each particular topic or sub-topic. In the event that completeness has been determined with respect to each decision table 30, then the rule engine 64 outputs a "done" instruction 68 to the UI control 80. If the rule engine 64 does not output a "done" instruction 68 that means there are one or more topics or sub-topics that are not complete, in which case, as explained in more detail below, the UI control 80 presents interview questions to a user for answer. The TLA 60 identifies a decision table 30 corresponding to one of the non-complete topics or sub-topics and, using the rule engine 64, identifies one or more non-binding suggestions 66 to present to the UI control 80. The non-binding suggestions 66 may include a listing or compilation of one or more questions (e.g., $Q_1$-$Q_5$ as seen in FIG. 7) from the decision table 30. In some instances, the listing or compilation of questions may be ranked in order by rank. The ranking or listing may be weighted in order of importance, relevancy, confidence level, or the like. For example, a top ranked question may be a question that, based on the remaining rows (e.g., $R_1$-$R_5$) in a decision will most likely lead to a path to completion. As part of this ranking process, statistical information such as the STAT1, STAT2 percentages as illustrated in FIG. 5 may be used to augment or aid this ranking process. Questions may also be presented that are most likely to increase the confidence level of the calculated tax liability or refund amount. In this regard, for example, those questions that resolve data fields associated with low confidence values may, in some embodiments, be ranked higher.

The following pseudo code generally expresses how a rule engine 64 functions utilizing a fact cache based on the runtime canonical data 62 or the instantiated representation of the canonical tax schema 46 at runtime and generating non-binding suggestions 66 provided as an input a UI control 80. As described in U.S. application Ser. No. 14/097, 057 previously incorporated herein by reference, data such as required inputs can be stored to a fact cache so that the needed inputs can be recalled at a later time, and to determine what is already known about variables, factors or requirements of various rules:

Rule engine (64)/Tax Logic Agent (TLA) (60)
    // initialization process
    Load_Tax_Knowledge_Base;
    Create_Fact_Cache; While (new_data_from_application)
    Insert_data_into_fact_cache;
    collection=Execute_Tax_Rules; // collection is all the
       fired rules and corresponding conditions
    suggestions=Generate_suggestions (collection);
    send_to_application(suggestions);

The TLA 60 may also receive or otherwise incorporate information from a statistical/life knowledge module 70. The statistical/life knowledge module 70 contains statistical or probabilistic data related to the taxpayer. For example, statistical/life knowledge module 70 may indicate that taxpayers residing within a particular zip code are more likely to be homeowners than renters. More specifically, the statistical/life knowledge module may comprise tax correlation data regarding a plurality of tax matter correlations. Each of the tax matter correlations quantifies a correlation between a taxpayer attribute and a tax related aspect. For instance, a taxpayer attribute could be taxpayer age which may be correlated to a tax related aspect such as having dependents, or a taxpayer attribute might be taxpayer age which may be correlated to homeownership or other relevant tax related aspect. The tax correlation data also quantifies the correlations, such as by a probability of the correlation. For instance, the correlation between the taxpayer attribute and the tax related aspect may be a certain percentage probability, such as 10%, 20%, 30%, 40%, 50%, 60%, or any percentage from 0% to 100%. Alternatively, the quantification can be a binary value, such as relevant or not relevant. In other words, for a given taxpayer attribute, it may be determined that a tax related aspect is relevant or completely not relevant when a taxpayer has the given taxpayer attribute. As an example, if the taxpayer attribute is that the taxpayer is married, the correlation may indicate that spouse information is relevant and will be required.

The TLA 60 may use this knowledge to weight particular topics or questions related to these topics. For example, in the example given above, questions about home mortgage interest may be promoted or otherwise given a higher weight. The statistical knowledge may apply in other ways as well. For example, tax forms often require a taxpayer to list his or her profession. These professions may be associated with transactions that may affect tax liability. For instance, a taxpayer may list his or her occupation as "teacher." The statistic/life knowledge module 70 may contain data that shows that a large percentage of teachers have retirement accounts and in particular 403(b) retirement accounts.

This information may then be used by the TLA 60 when generating its suggestions 66. For example, rather than asking generically about retirement accounts, the suggestion 66 can be tailored directly to a question about 403(b) retirement accounts.

The data that is contained within the statistic/life knowledge module 70 may be obtained by analyzing aggregate tax data of a large body of taxpayers. For example, entities having access to tax filings may be able to mine their own proprietary data to establish connections and links between various taxpayer characteristics and tax topics. This information may be contained in a database or other repository that is accessed by the statistic/life knowledge module 70. This information may be periodically refreshed or updated to reflect the most up-to-date relationships. Generally, the data contained in the statistic/life knowledge module 70 is not specific to a particular tax payer but is rather generalized to characteristics shared across a number of tax payers although in other embodiments, the data may be more specific to an individual taxpayer.

Still referring to FIG. 7, the UI controller 80 encompasses a user interface manager 82 and a user interface presentation or user interface 84. The user interface presentation 84 is controlled by the interface manager 82 and may manifest itself, typically, on a visual screen or display 104 that is presented on a computing device 102 (seen, for example, in FIG. 10). The computing device 102 may include the display of a computer, laptop, tablet, mobile phone (e.g., Smartphone), or the like. Different user interface presentations 84 may be invoked using a UI generator 85 depending, for example, on the type of display or screen 104 that is utilized by the computing device. For example, an interview screen with many questions or a significant amount of text may be appropriate for a computer, laptop, or tablet screen but such as presentation may be inappropriate for a mobile computing device such as a mobile phone or Smartphone. In this regard, different interface presentations 84 may be prepared for different types of computing devices 102. The nature of the interface presentation 84 may not only be tied to a particular computing device 102 but different users may be given different interface presentations 84. For example, a taxpayer that is over the age of 60 may be presented with an interview screen that has larger text or different visual cues than a younger user.

The user interface manager 82, as explained previously, receives non-binding suggestions from the TLA 60. The non-binding suggestions may include a single question or multiple questions that are suggested to be displayed to the taxpayer via the user interface presentation 84. The user interface manager 82, in one aspect of the invention, contains a suggestion resolution element 88, which is responsible for resolving how to respond to the incoming non-binding suggestions 66. For this purpose, the suggestion resolution element 88 may be programmed or configured internally. Alternatively, the suggestion resolution element 88 may access external interaction configuration files. Additional details regarding configuration files and their use may be found in U.S. patent application Ser. No. 14/206,834, which is incorporated by reference herein.

Configuration files specify whether, when and/or how non-binding suggestions are processed. For example, a configuration file may specify a particular priority or sequence of processing non-binding suggestions 66 such as now or immediate, in the current user interface presentation 84 (e.g., interview screen), in the next user interface presentation 84, in a subsequent user interface presentation 84, in a random sequence (e.g., as determined by a random number or sequence generator). As another example, this may involve classifying non-binding suggestions as being ignored. A configuration file may also specify content (e.g., text) of the user interface presentation 84 that is to be generated based at least in part upon a non-binding suggestion 66.

A user interface presentation 84 may comprise pre-programmed interview screens that can be selected and provided to the generator element 85 for providing the resulting user interface presentation 84 or content or sequence of user interface presentations 84 to the user. User interface presentations 84 may also include interview screen templates, which are blank or partially completed interview screens that can be utilized by the generation element 85 to construct a final user interface presentation 84 on the fly during runtime.

As seen in FIG. 7, the UI controller 80 interfaces with the shared data store 42 such that data that is entered by a user in response to the user interface presentation 84 can then be transferred or copied to the shared data store 42. The new or updated data is then reflected in the updated instantiated representation of the schema 44. Typically, although not exclusively, in response to a user interface presentation 84 that is generated (e.g., interview screen), a user inputs data to the tax preparation software 100 using an input device that is associated with the computing device. For example, a taxpayer may use a mouse, finger tap, keyboard, stylus, voice entry, or the like to respond to questions. The taxpayer may also be asked not only to respond to questions but also to include dollar amounts, check or un-check boxes, select one or more options from a pull down menu, select radio buttons, or the like. Free form text entry may also be requested from the taxpayer. For example, with regard to donated goods, the taxpayer may be prompted to explain what the donated goods are and describe the same in sufficient detail to satisfy requirements set by a particular taxing authority.

Still referring to FIG. 7, in one aspect, the TLA 60 outputs a current tax result 65 which can be reflected on a display 104 of a computing device 102, 103. For example, the current tax result 65 may illustrate a tax due amount or a refund amount. The current tax results 65 may also illustrate various other intermediate calculations or operations used to calculate tax liability. For example, AGI or TI may be illustrated. Deductions (either itemized or standard) may be listed along with personal exemptions. Penalty or tax credits may also be displayed on the computing device 102, 103. This information may be displayed contemporaneously with other information, such as user input information, or user interview questions or prompts or even narrative explanations 116 as explained herein.

The TLA 60 also outputs a tax data that is used to generate the actual tax return (either electronic return or paper return). The return itself can be prepared by the TLA 60 or at the direction of the TLA 60 using, for example, the services engine 90 that is configured to perform a number of tasks or services for the taxpayer. The services engine 90 is operatively coupled to the TLA 60 and is configured to perform a number of tasks or services for the taxpayer. For example, the services engine 90 can include a printing option 92. The printing option 92 may be used to print a copy of a tax return, tax return data, summaries of tax data, reports, tax forms and schedules, and the like. The services engine 90 may also electronically file 94 or e-file a tax return with a tax authority (e.g., federal or state tax authority). Whether a paper or electronic return is filed, data from the shared data store 42 required for particular tax forms, schedules, and the like is transferred over into the desired format. With respect to e-filed tax returns, the tax return may be filed using the MeF web-based system that allows electronic filing of tax returns through the Internet. Of course, other e-filing systems may also be used other than those that rely on the MeF standard. The services engine 90 may also make one or more recommendations 96 based on the run-time data 62 contained in the TLA 60. For instance, the services engine 90 may identify that a taxpayer has incurred penalties for underpayment of estimates taxes and may recommend to the taxpayer to increase his or her withholdings or estimated tax payments for the following tax year. As another example, the services engine 90 may find that a person did not contribute to a retirement plan and may recommend 96 that a taxpayer open an Individual Retirement Account (IRA) or look into contributions in an employer-sponsored retirement plan. The services engine 90 may also include a calculator 98 that can be used to calculate various intermediate calculations used as part of the overall tax calculation algorithm. For example, the calculator 98 can isolate earned income, investment income, deductions, credits, and the like. The calculator 98 can also be used to estimate tax liability based on certain changed assumptions (e.g., how would my taxes change if I was married and filed a joint return?). The calculator 98 may also be used to compare analyze differences between tax years.

By using calculation graphs 14 to drive tax calculations and tax operations, it is possible to determine interdependencies of the nodes (including tax operations, functional nodes and function nodes) and the year-over-year calculation graphs 14 can be used to readily identify differences and report the same to a user. Differences can be found using commonly used graph isomorphism algorithms over the two respective calculation graphs 14.

As shown in FIG. 7, the tax preparation system 40 includes a change analysis engine 210. The change analysis engine 210 may operate within the tax preparation software 100, or it may be a separate software application operating independent of the tax preparation software 100, or it may be a separate software program operatively coupled with the tax preparation software 100. As described above, the change analysis engine 210 is configured to execute a tax comparison function which can analyze, compare, and contrast the tax results obtained from two or more different sets of tax data for the tax payer. For instance, the user may enter first tax data comprising a first set of tax data for the taxpayer, and then make changes by modifying data in the first set and/or entering additional tax data, resulting in second tax data which is different from the first tax data. The user may desire to compare the tax results (e.g. refund amount) obtained from first tax data with the tax results (e.g. refund amount) obtained from the second tax data.

To initiate the change analysis engine 210, the tax preparation system 40 may be configured to receive a number of commands from the user to utilize the tax comparison function. After the first tax data is input into the system 40 by any of the various means described herein, the system 40 receives a first compare command from the user which instructs the system 40 to save the first tax data for comparison with a subsequent set of tax data. The system 40 may then save the first tax data, such as in the shared data store 42, or in a data store of the change analysis engine 210. The first tax data is then changed, such as by modifying the first tax data and/or by receiving additional tax data, resulting in second tax data. The system 40 then receives a second compare command instructing the system 40 to save the second tax data for comparison with the first tax data. The system 40 may be configured to compare additional sets of tax data, in the same manner. The remaining discussion of the change analysis engine and the tax comparison functionality will be described with respect to comparing two sets of tax data, with the understanding that they may analyze and compare three or more sets of tax data in the same manner.

The system 40 calculates one or more of the tax calculation graphs 14, such as tax calculation graph 14 shown in FIGS. 6A and 6B, using the first tax data, and stores the results as the first calculated tax calculation graph(s). The system 40 also calculates the same one or more tax calculation graphs 14 using the second tax data, and stores the results as the second calculated tax calculation graph(s). For ease of understanding, the change analysis engine 210 and tax comparison functionality will be described with respect to one tax calculation graph, with the understanding that any one or more tax calculation graphs can be utilized in the same manner.

The tax preparation system 40 then executes the change analysis engine 210. The system 40 may be configured to execute the change analysis engine upon or after receiving the second compare command, and/or upon receiving a specific instruction from the user to execute the tax comparison function.

The tax calculation graph 14 used for the tax comparison function includes a first node for a tax result of interest, such as the tax refund or tax owed for the overall tax return (shown as node 26a in FIGS. 6A and 6B). The tax result of interest could be any functional node 26, tax operation 29 or other node on the tax calculation graph, such as the adjusted gross income. For instance, the first node may be the tax payable or tax refund node (i.e. tax due) 26a as shown in FIGS. 6A and 6B. Thus, functional node 26a may be considered a "tax result" for the tax return. The first node can be any node of interest, such as taxable income node 26b, adjusted gross income ("AGI") node 26c, earned income credit ("EIC") node 26d, etc., and may be on any of the tax calculation graphs 14. As an example, for a tax calculation graph of the Affordable Care Act (ACA) penalty, the first node may be the amount of a ACA penalty, if any. The first node may be predetermined by the system 40, or the system 40 may be configured to allow the user to select the tax result of interest, such as by displaying to the user a list of possible tax results of interest and then receiving a selection from the user.

The change analysis engine 210 is configured to analyze the first tax data and the second tax data to determine the differences between the first tax data and the second tax data. The change analysis engine 210 may access the first and second tax data by any suitable means, such as by reading the tax data from the shared data store, or by having the tax data transferred and stored at the change analysis engine, etc. The change analysis engine 210 compares the first tax data and second tax data and determines any differences. The differences may be a difference in a value for the same data point, or it could that one of the sets of data has data not in the other set. The change analysis engine 210 may also determine the nodes on the tax calculation graph 14 for the differences. For example, the difference(s) may be at one or more of the input nodes 24, such as nodes 24a, 24b, 24c, etc. as shown on FIGS. 6A and 6B.

The change analysis engine 210 is also configured to access the first calculated tax calculation graph and the second calculated tax calculation graph. The change analysis engine 210 may access the first and second tax calculation graphs by any suitable means, such as by reading the graphs from the shared data store or a data store of the change analysis engine, the graphs may be transferred by the system 40 to the change analysis engine, etc.

The change analysis engine 210 then analyzes the first and second calculated tax calculation graphs to determine whether the first calculated tax value differs from the second calculated tax value for the first node. This may be done by simply comparing the first calculated tax value and the second calculated tax value. It is possible to have differing first tax data and second tax data, and the tax result for the first node may be the same or different. For example, a change in the number of dependents between the first tax data and second tax data may have no effect on the tax refund if the taxpayer was not eligible for an earned income credit with either number of dependents, and assuming the number of dependents did not affect other nodes, such as the deductions node 28b. This determination is utilized by the change analysis engine 210 to determine whether it will determine changed nodes in the case that there is a difference between the first and second calculated tax values, or whether it will determine unchanged nodes in the case that there is not a difference.

When the change analysis engine 210 determines that the first and second calculated tax values are different, i.e. there is a change in the tax result obtained from the first tax data compared to the second tax data, the change analysis engine 210 analyzes the first and second calculated tax calculation graphs to determine (i.e. identify) one or more "changed node(s)" on the tax calculation graph 14. A changed node is a node in which the value for the node differs between the first tax calculation graph and the second tax calculation graph. As used herein, a value of a node is considered to differ between the first calculated tax calculation graph and the second calculated tax calculation graph when one of the calculated tax calculation graphs has a value for a node but the other one does not have a value. As some examples of changed nodes using FIGS. 6A and 6B, the first tax calculation graph may have one W2 node 24a (and no values for nodes 24b and 24c) and a value of 3 for dependents node 24l, while the second tax calculation graph has two W2 nodes 24a and 24b and a value of 1 for dependents node 24l. In such a case, the change analysis system 210 would determine the changed nodes as node 24b as an additional node on the second tax calculation graph and node 24l having a value that changed from 3 to 1 from first calculated tax calculation graph to the second calculated tax calculation graph.

The change analysis engine 210 is configured to determine the changed node(s) by traversing the first calculated tax calculation graph and the second tax calculation graph and comparing the values for the respective calculated tax calculation graphs at corresponding nodes. The change analysis engine 210 may traverse node by node from the bottom-up through the tax calculation graph starting at the first node, or from the top-down through the calculation graph starting at a changed input node 24.

In addition, the change analysis engine 210 may utilize pre-defined impact chains 202 determined from the tax calculation graph to determine the changed and/or unchanged nodes between the first calculated tax calculation graph and the second calculated tax calculation graph. Several examples of impact chains 202 are shown on FIGS. 6A and 6B. An impact chain 202 is a sequence of interdependent nodes within the tax calculation graph having a cause and effect relationship. In other words, an impact chain for a particular node consists of one of (a) each of the other nodes which are affected by the particular node, or (b) each of the other nodes which affect the particular node. A first node "is affected" by another node if the first node is dependent on the other node, such as the value, result or outcome of the first node depends on the value, result or outcome of the other node. Similarly, a first node "affects" another node if the other node is dependent on the first node, such as the value, result or outcome of the other node depends on the value, result or outcome of the first node. The nodes of the tax calculation graph comprise a plurality of input nodes, functional nodes, function nodes, and tax operations (which are defined by a functional node and an associated function). An impact chain engine of the tax preparation system 40 may be configured to analyze the tax calculation graph 14 and determine one or more impact chains 202, wherein each impact chain includes each of the nodes in the tax calculation graph which are interdependent on each other. An example of an impact chain engine is described in U.S. patent application Ser. No. 14/529,798, which is incorporated by reference as if set forth fully herein.

In order to determine the changed nodes, the change analysis engine 210 traverses up the impact chain 202 starting at the first node (the tax result of interest) on each of the first and second tax calculation graphs and identifies any of the nodes having values which differ between the first and second calculated tax calculation graphs. For example, if the first node is the EIC node 26d, the impact chain 202b traverses up to each of the nodes which may affect the EIC node 26d.

The impact chains may also be used to determine impact correlations between nodes of the tax calculation graph. An impact correlation defines a relationship between a first node and a second node, which defined relationship may be a qualitative impact correlation or a quantitative impact correlation. The impact correlations may be utilized to assist in generating the explanation of reason(s) that a first calculated tax value and a second calculated tax value are different or the same, as the case may be. Details of impact correlations are described in U.S. patent application Ser. No. 14/529,798, which is incorporated by reference as if set forth fully herein.

The tax preparation system 40 is further configured to generate an explanation of a reason that the first calculated tax value and the second calculated tax value for the first node differ based on the one or more changed node(s). The explanation may also be based on the first node and intervening nodes between the first node and the changed node, depending on the context of the nodes. Referring again to FIG. 7, the system 40 may include an explanation engine 110 that operates within the tax preparation software 100 to generate a narrative explanation from the explanation data associated with the changed nodes(s), first node and/or intervening nodes. The explanation engine 110 may be a sub-system separate from the change analysis engine 210, or it may be integrated with the change analysis engine 210.

In order to generate a narrative explanation for a particular change in tax results between the first tax result for the first tax data and the second tax result for the second tax data, the explanation engine 110 may extract a stored function 28 that is associated with the particular functional node 26. The stored function 28 is one function of a defined set and may be associated with a brief explanation. For example, a "cap" function may be associated with an explanation of "value exceeds cap." This brief explanation can be combined with explanation data and/or narrative for one or more explanation regarding the changed node and how it relates to the first node or an intervening node. For example, a functional node 26 paired with a stored "cap" function 28 may give a contextual tax explanation that is more than merely "value exceeds cap." For instance, a pre-stored narrative associated with the particular functional node 26*d* on FIG. 6A having to do with the earned income tax credit as it relates to the tax refund or tax owed node 26*a* within the calculation graph 14 may be a complete statement or sentence such as "Your tax refund decreased first tax data and the second tax data because the your income increased by $[variable] and you do not qualify for the earned income credit because your income exceeds $[cap value]." In other embodiments, the pre-stored narrative may be only a few words or a sentence fragment. In the above example, the pre-stored narrative may be "credit subject to income phase out" or "AGI too high." A particular functional node 26 and associated function 28 may have multiple pre-stored explanation data and narratives. The particular explanation data and narrative(s) that is/are associated with a particular functional node 26 and associated function 28 may be stored in entries 112 in a data store or database such as data store 42 of FIG. 7. For example, with reference to FIG. 7, data store 42 contains the pre-stored explanation data and narratives that may be mapped or otherwise tagged to particular functional nodes 26 contained within the calculation graph(s) 14. The locations or addresses of the various functional nodes 26 can be obtained using the calculation graphs 14.

The stored entries 112 can be recalled or extracted by the explanation engine 110 to generate explanations 118 of reasons that the first and second calculated tax values differ or do not differ, as the case may be. Then, the explanation 118 of the reason can be displayed to a user on a display 104 of a computing device 102. For example, explanation engine 110 may interface with the UI control 80 in two-way communication such that a user may instruct the tax preparation system 40 to display the comparison of the tax results for the first tax data and second tax data, as well as selecting a tax result (which corresponds to the first node) to be compared.

The explanation engine 110 may be configured to generate multiple explanations 118 of reasons that the first tax result and second tax result differ. Moreover, the explanation engine 110 may generate multiple and/or different explanations 118 for the same reason that the first tax result differs from the second tax result, such as explanations having differing levels of detail such as a basic explanation with the least detail, an intermediate explanation having more detail, and a detailed explanation having the most detail. The multiple explanations may be alternative or cumulative, depending on the situation.

Figure 8A:
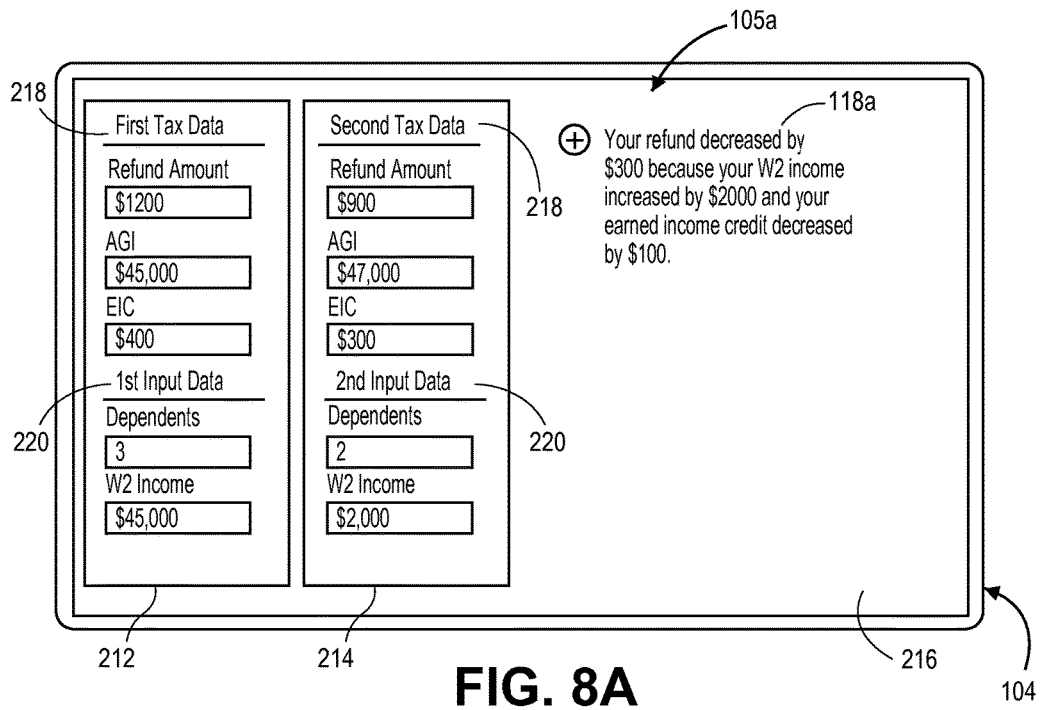
FIG. 8A illustrates a display of a computing device displaying a tax comparison screen according to one embodiment.
Figure 8B:
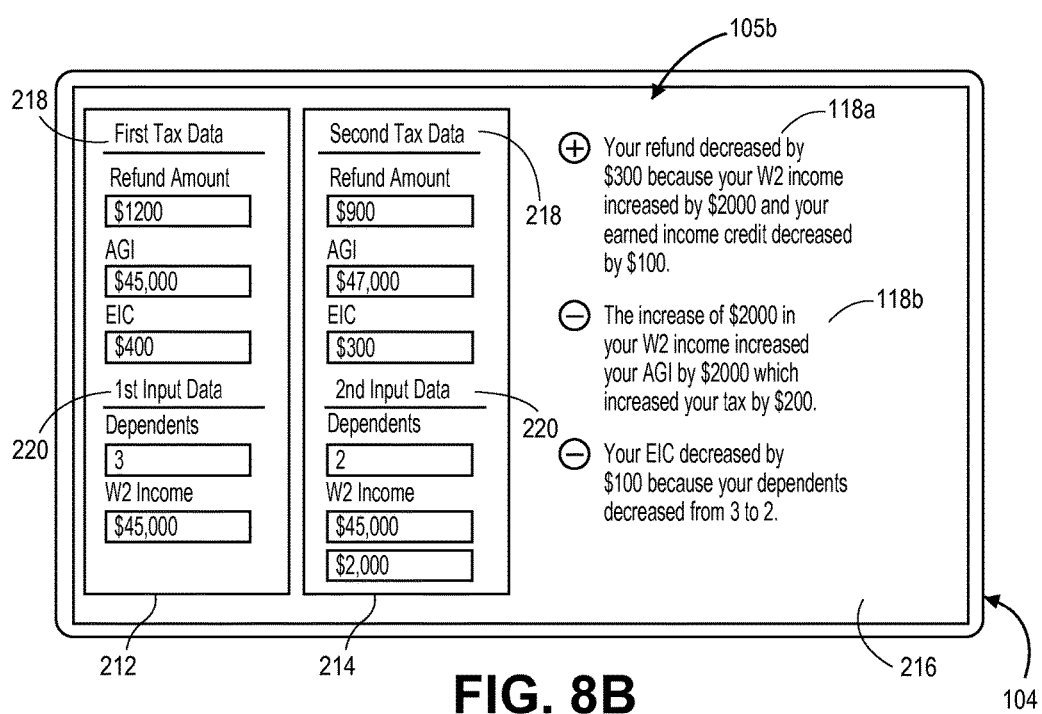
FIG. 8B illustrates a display of a computing device displaying a tax comparison according to another embodiment.

The explanations 118 may be displayed to the user on a comparison screen 105 (examples are shown in FIGS. 8A and 8B) which may include the explanations 118, as well as related differing calculated tax values and differing tax data between the first and second tax results to provide more context of the comparison to the user. The comparison screen 105 may be displayed automatically upon receiving certain second tax data, for example, or upon receiving an instruction from the user, such as selection of a "display tax comparison" button or other function selection mode. The comparison screen 105 may be displayed on the full display screen, on part of the display screen, in a side bar, a window, a panel, a pop-up screen, or other suitable mode for displaying the comparison screen 105.

FIGS. 8A and 8B illustrate two example comparison screen shots 105*a* and 105*b* of a comparison of the tax results for the first tax data and the second tax data displayed on a display 104 of a computing device, 102,103. The comparison screen shots include a first tax data window 212, a second tax data window 214 and an explanation window 216. The first tax data window 212 contains tax data 218 from the first calculated tax calculation graph, including the first calculated tax value, several other values for calculated function nodes, and one or more differing tax data 220, such as the first tax data which differs from the second tax data, preferably the tax data which differs and is pertinent to the explanations 118 in the explanation window 216. Similar to the first tax data window 212, the second tax data window 214 contains tax data 218 from the second calculated tax calculation graph. In the examples of FIGS. 8A and 8B, the first node is the tax refund node 28*a* on the tax calculation graph of FIGS. 6A and 6B, and the number of dependents node 24*l* and the W2 node 24*b* were determined to differ between the first and second calculated tax calculation graphs. Accordingly, the first and second tax data windows 212, 214 display the refund amount, AGI, and EIC for the calculated function nodes 26, and the number of dependents and W2 income for the input nodes 24.

An exemplary generated explanation 118 of reasons that the first calculated tax value differs from the second calculated tax value is displayed in the explanation window 216 on the data display screen 104. In the example illustrated in FIGS. 8A and 8B, the first tax data differs from the second tax data as follows: the first tax data has 3 dependents for the dependent node 24*l*, while the second tax data has 2 dependents for the dependent node 24*l*; and the first tax data has only one W2 for $45,000 of income, while the second tax data has two W2s, the same W2 for $45,000, and a second W2 for $2000. The tax preparation system 40, performed the steps described above, including executing the change analysis engine 210, and has generated the comparison screen of FIG. 8A, which is displayed on a user's display 104 of a computing device 102, 103.

As shown in FIGS. 8A and 8B, the explanations 118 have different levels of detail which are selectable by the user. In FIG. 8A, the explanation 118a has a basic explanation as to the reason that the taxpayer's refund decreased by $300 as a result of the differences in the first and second tax data (specifically, because the W2 income increased by $2000 and the earned income credit decreased by $100). The explanation 118a may include one or more selections such as button(s) ("+" sign), or various text that is selectable, such as hyperlinked text, which the user can click on to expand the explanation 118a. For example, the explanation 118a is expanded into the more detailed explanations 118b as shown in FIG. 8B. The explanations 118b provides additional detail of the reason there is a difference between the first tax result and the second tax result. The more detailed explanations 118b may also include one or more selections selectable by the user to see additional explanations and/or details for the explanation.

When the change analysis engine 210 determines that there is not a difference between the first calculated tax value and the second calculated tax value (i.e. the first tax result for the first tax data is the same as the second tax result for the second tax data), the tax preparation system 40 is configured to analyze the results and generate an explanation of a reason that the first and second tax results are the same. Accordingly, the change analysis engine 210 is configured such that when the change analysis engine 210 determines there is no difference between the first calculated tax value and the second calculated tax value for the first node, then the change analysis engine 210 analyzes the first calculated tax calculation graph and the second calculated tax calculation graph to determine one or more unchanged node(s). The unchanged node(s) are nodes on the calculation graph having no difference in value between the first calculated tax calculation graph and the second calculated tax calculation graph along a calculation path connecting to an input node at which the value for the input node differs between the first calculated tax calculation graph and the second calculated tax calculation graph. This process identifies nodes on the tax calculation graph 14 which depend on an input node (e.g. input nodes 24 on FIGS. 6A-6B) which changed between the first tax data and the second tax data, but the tax result (i.e. the value of the first node) did not change as a result of the change in taxpayer tax data.

The change analysis engine 210 determines the unchanged node(s) in the same or substantially similar manner as determining the changed node(s), as described above. The change analysis engine 210 traverses the first calculated tax calculation graph and the second calculated tax calculation graph and compares the values at corresponding nodes. The change analysis engine may commence at an input node 24 which is changed between the first and second tax data, and then traverse down along each calculation path of the calculation graph 14 to identify nodes which are unchanged between the first and second calculated tax calculation graphs. This process identifies nodes which are unchanged between the first and second calculated tax calculation graphs, but which also depend from an input node 24 which changed between the first tax data and second tax data. For instance, if first tax data has no investment income at node 24g of the calculation graph 14 of FIG. 6B, and the second tax data includes $5000 of investment income at node 24g, then the change analysis engine 210 commences at node 24g and traverses down the first and second calculated tax calculation graphs to determine unchanged node(s). In other words, the change analysis engine 210 traverses down through each calculation path which could be affected by the investment income node 24g to identify unchanged node(s).

The change analysis engine 210 may also be configured to determine the unchanged node(s) by identifying node(s) closest to the input node 14 at which the value for the input node 24 differs between the first calculated tax calculation graph and the second calculated tax calculation graph along the calculation path. In this way, the change analysis engine can identify the initial unchanged node in a chain, wherein the subsequent nodes will also be unchanged, unless the subsequent node has an intersecting calculation path to a node which is changed between the first and second tax data As with determining changed node(s), the change analysis engine 210 may utilize impact chains 202 to determine the unchanged node(s). for the example of a change in investment income node 24g, the change analysis engine traverses down the impact chain 202a, as shown in FIG. 6A, to determine the unchanged node(s).

The tax preparation system may also be configured to generate an explanation of a reason there is no difference between the first calculated tax value and the second calculated tax value based upon the one or more unchanged node(s). This is similar to generating an explanation of a reason that the first and second calculated tax value differ, except it is determining a reason that they are the same. Accordingly, all of the description above for generating explanation(s) of a reason the tax results differ, applies to the generating explanation(s) of a reason there is no difference between the first and second tax results.

Figure 8C:
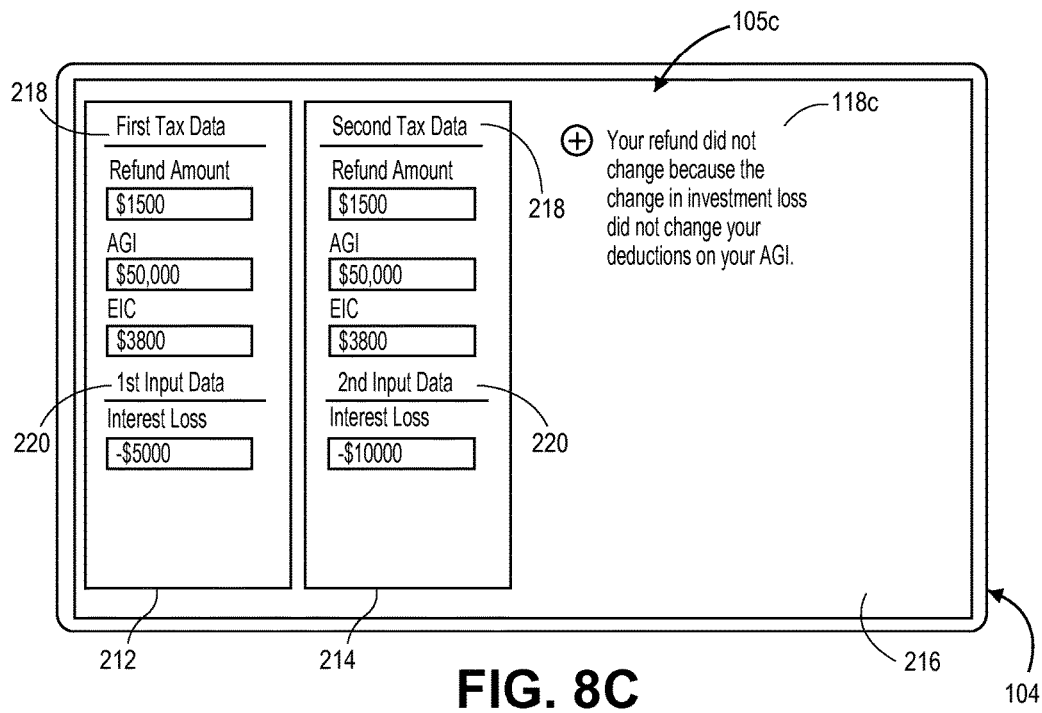
FIG. 8C illustrates a display of a computing device displaying a tax comparison according to another embodiment.
Figure 8D:
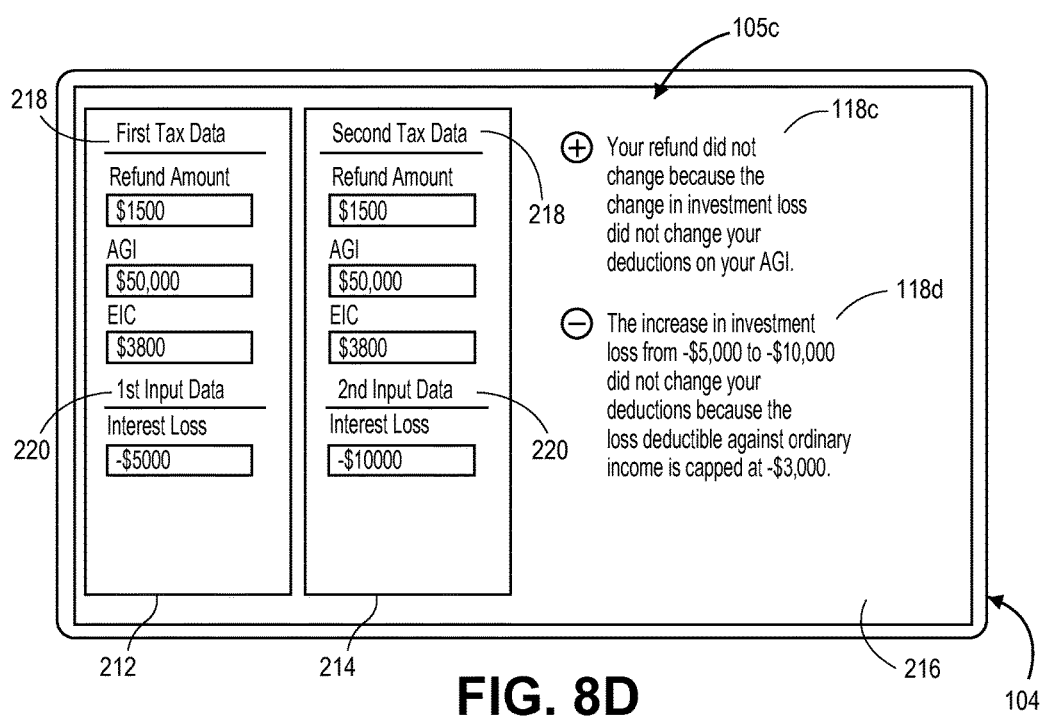
FIG. 8D illustrates a display of a computing device displaying a tax comparison according to another embodiment.

FIGS. 8C-8D illustrate two example comparison screen shots 105c and 105d of a comparison of the tax results in a case where there is no difference between the first and second tax results. Again, the display of the comparison of tax results that do not differ is done in the same manner and has the same features as for tax results that differ, and the description above applies equally. In the example of FIGS. 8C-8D, the first tax data and second tax data differ in that the first tax data has an investment loss node 24g of –$5,000 and the second tax data has investment loss node 24g of –$10,000. The first node (i.e. the tax result of interest) is the tax refund/tax due node 26a. The tax preparation system 40, performed the steps described above, including executing the change analysis engine 210. The change analysis engine 210 has determined the following unchanged nodes: AGI node 26c, taxable income node 26b, total deductions 26e. The system 40 has generated the comparison screens of FIGS. 8C-8D, which is displayed on a user's display 104 of a computing device 102, 103.

As shown in FIGS. 8C and 8D, the explanations 118 have different levels of detail which are selectable by the user. In FIG. 8A, the explanation 118c has a basic explanation as to the reason that the taxpayer's refund did not change from $1500 as a result of the increase in the investment loss by $5000. As with the explanations 118 of FIGS. 8A and 8B, The explanation 118c may include one or more selections such as button(s) ("+" sign), or various text that is selectable, such as hyperlinked text, which the user can click on to expand the explanation 118c. For example, the explanation 118c is expanded into the more detailed explanations 118d as shown in FIG. 8D. The explanations 118d provide additional detail of the reason there is no difference between the first tax result and the second tax result. The more detailed explanations 118d may also include one or more selections selectable by the user to see additional explanations and/or details for the explanation.

In one aspect of the invention, the choice of what particular explanation will be displayed to a user may vary. For example, different explanations associated with the same function node 26 and first node (i.e. tax result) may be selected by the explanation engine 110 for display to a user based on the user's experience level. A basic user may be given a general or summary explanation while a user with more sophistication may be given a more detailed explanation. A professional user such as a CPA or other tax specialist may be given even more detailed explanations. FIGS. 8A-8D illustrates different explanations that may displayed to different users that have various degrees of explanation. FIGS. 8A and 8C illustrate a basic explanation 118*a*, 118*c*, while FIGS. 8B and 8D show more detailed explanations 118*b*, 118*d*. While two explanations of varying detail are illustrated in the context of FIGS. 8A-8D, additional levels of simplicity/complexity for the explanation can be used.

In some embodiments, the different levels of explanation may be tied to product types or codes. These may be associated with, for example, SKU product codes. For example, a free edition of the tax preparation software 100 may provide few or no explanations. In a more advanced edition (e.g., "Deluxe edition"), additional explanation is provided. Still more explanation may be provided in the more advanced editions of the tax preparation software 100 (e.g., "Premier edition"). Versions of the tax preparation software 100 that are developed for accountants and CPAs may provide even more explanation.

In still other embodiments a user may be able to "unlock" additional or more detailed explanations by upgrading to a higher edition of tax preparation software 100. Alternatively, a user may unlock additional or more detailed explanations in an a la carte manner for payment of an additional fee. Such a fee can be paid through the tax preparation software 100 itself using known methods of payment.

Figure 9:
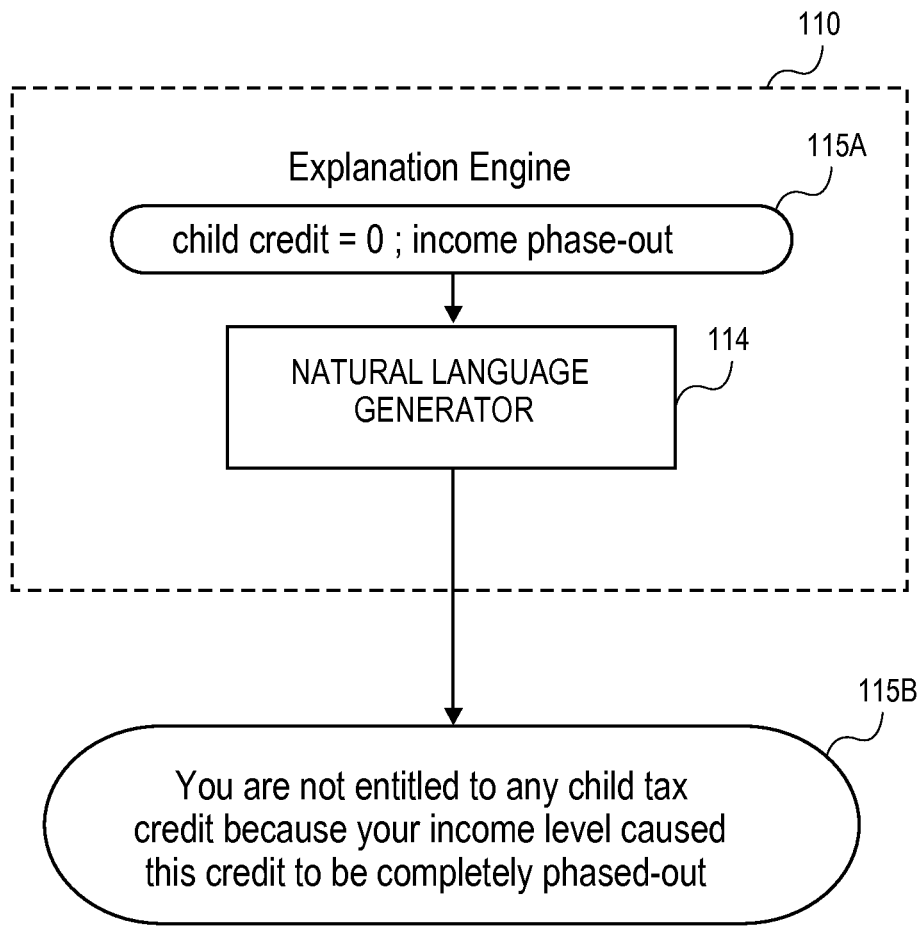
FIG. 9 illustrates an explanation engine that is part of the system of FIG. 7. The explanation engine generates narrative explanations that can be displayed or otherwise presented to users to explain one or more tax calculations or operations that are performed by the tax preparation software.

FIG. 9 illustrates additional details of the explanation engine 110 according to an embodiment of the invention. In this embodiment, the explanation engine 110 includes a natural language generator 114 that converts fragments, expressions or partial declaratory statements into natural language expressions that are better understood by users. The natural language expressions may or may not be complete sentences but they provide additional contextual language to the more formulaic, raw explanations that may be tied directly to the explanation associated with a function node 26 and associated function 28. In the example of FIG. 9, a brief explanation 115A extracted by the explanation engine 110 which indicates that the child credit tax is zero due to phase out from income level is then subject to post-processing to convert the same into a more understandable sentence that can be presented to the user. In this example, the user is provided with a natural language explanation 1158 that is more readily understood by users.

In one aspect of the invention, the natural language generator 114 may rely on artificial intelligence or machine learning such that results may be improved. For example, the explanation engine 110 may be triggered in response to a query that a user has typed into a free-form search box within the tax preparation software 100. The search that has been input within the search box can then be processed by the explanation engine 110 to determine what tax operation the user is inquiring about and then generate an explanatory response 115B.

Encapsulating the tax code and regulations within calculation graphs 14 results in much improved testability and maintainability of the tax preparation software 100. Software programming errors ("bugs") can be identified more easily when the calculation graphs 14 are used because such bugs can be traced more easily. In addition, updates to the calculation graphs 14 can be readily performed when tax code or regulations change with less effort.

Further, the degree of granularity in the explanations 118 that are presented to the user can be controlled. As explained in the context of FIGS. 8A-8D, different levels of details can be presented to the user. This can be used to tailor the tax preparation software 100 to provide scalable and personalized tax explanations to the user. In addition, the explanations 118 can be quickly altered and updated as needed given that they are associated with the calculation graphs and are not hard coded throughout the underlying software code for the tax preparation software 100.

In operation of the system 40 to prepare a tax return, a user initiates the tax preparation software 100 on a computing device 102, 103 as seen, for example, in FIG. 10. The tax preparation software 100 may reside on the actual computing device 102 that the user interfaces with or, alternatively, the tax preparation software 100 may reside on a remote computing device 103 such as a server or the like as illustrated. In such instances, the computing device 102 that is utilized by the user or tax payer communicates via the remote computing device 103 using an application 106 contained on the computing device 102. The tax preparation software 100 may also be run using conventional Internet browser software. Communication between the computing device 102 and the remote computing device 103 may occur over a wide area network such as the Internet. Communication may also occur over a private communication network (e.g., mobile phone network).

A user initiating the tax preparation software 100, as explained herein may import tax related information from one or more data sources 48. Tax data may also be input manually with user input 48*a*. The tax calculation engine 50 computes one or more tax calculations dynamically based on the then available data at any given instance within the schema 44 in the shared data store 42. In some instances, estimates or educated guesses may be made for missing data. Details regarding how such estimates or educated guesses are done maybe found in U.S. patent application Ser. No. 14/448,986 which is incorporated by reference as if set forth fully herein. As the tax preparation software 100 is calculating or otherwise performing tax operations, the user may enter a number of commands to execute the tax comparison function, as described above. The system 40 then executes the tax calculation engine 50 to generate a first calculated tax calculation graph based on first tax data and a second calculated tax calculation graph based on second tax data differing from the first tax data.

The system 40 executes the change analysis engine to determine whether a first tax result for a first node within the first calculated tax calculation graph differs from a second tax result for the first node within the second calculated tax calculation graph. When the change analysis system 210 determines the first tax result and second tax result differ, the change analysis system 210 analyzes the first and second calculated tax calculation graphs to determine one or more changed node(s). Then, the system 40 executes the explanation engine 110 to generate explanation(s) of a reason that the first and second tax results differ. The system 40 may then display a tax comparison screen 105 including pertinent tax data 212 and the explanation(s) 118 to the user.

When the change analysis system determines there is no difference between the first tax result and the second tax result, the change analysis system analyzes the first and second calculated tax calculation graphs to determine one or more unchanged node(s). Then, the system 40 executes the explanation engine 110 to generate explanation(s) 118 of a reason that the first and second tax results do not differ. The system 40 may then display a tax comparison screen 105 including pertinent tax data 212 and the explanation(s) 118 to the user.

Figure 11:
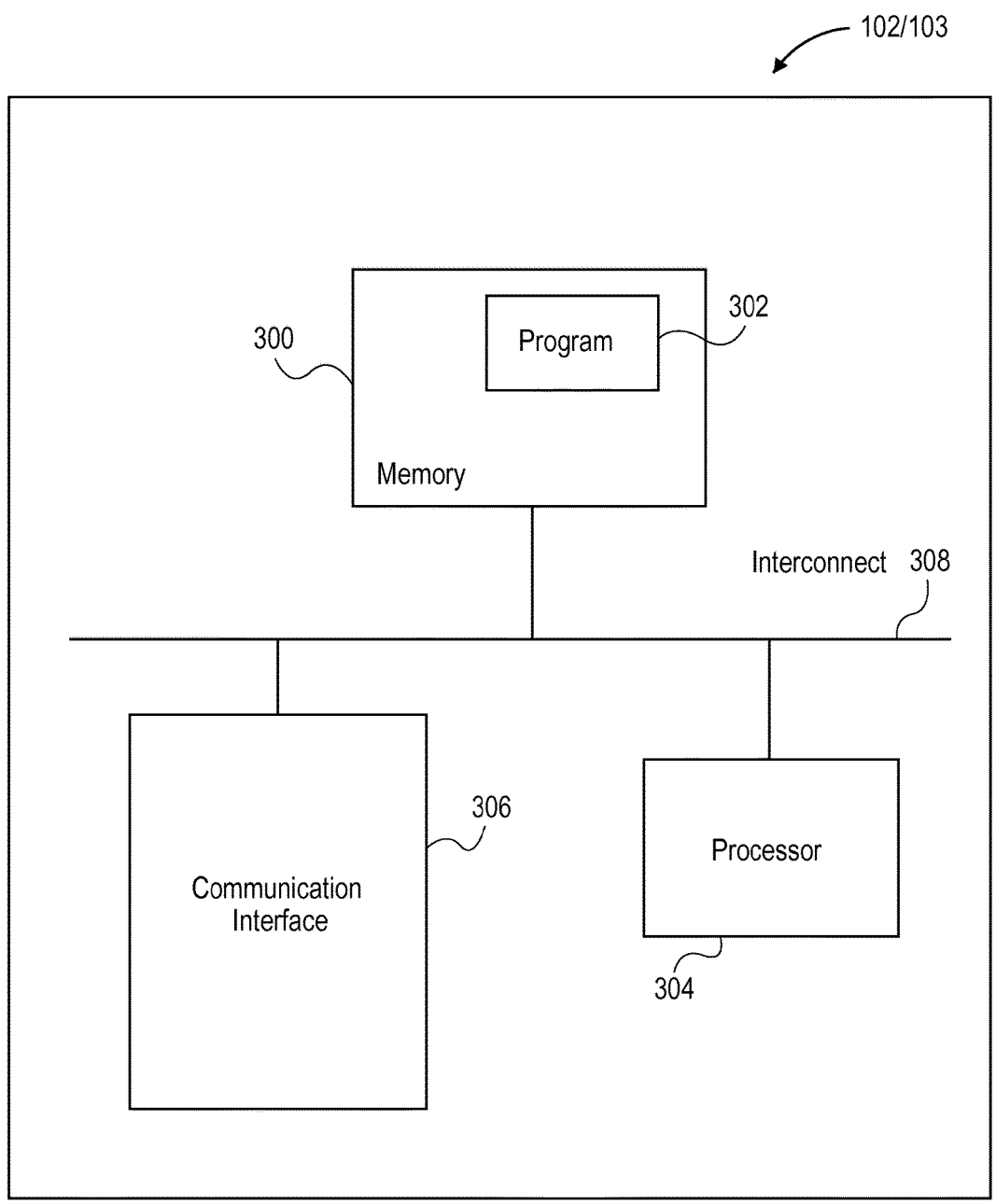
FIG. 11 illustrates generally the components of a computing device that may be utilized to execute the software for automatically calculating or determining tax liability, performing a tax comparison, and preparing a tax return based thereon, according to the embodiments of the invention.

FIG. 11 generally illustrates components of a computing device 102, 103 that may be utilized to execute the software for automatically calculating or determining tax liability and preparing an electronic or paper return based thereon. The components of the computing device 102 include a memory 300, program instructions 302, a processor or controller 304 to execute program instructions 302, a network or communications interface 306, e.g., for communications with a network or interconnect 308 between such components. The computing device 102, 103 may include a server, a personal computer, laptop, tablet, mobile phone, or other portable electronic device. The memory 300 may be or include one or more of cache, RAM, ROM, SRAM, DRAM, RDRAM, EEPROM and other types of volatile or non-volatile memory capable of storing data. The processor unit 304 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 308 may include a system bus, LDT, PCI, ISA, or other types of buses, and the communications or network interface may, for example, be an Ethernet interface, a Frame Relay interface, or other interface. The interface 306 may be configured to enable a system component to communicate with other system components across a network which may be a wireless or various other networks. It should be noted that one or more components of the computing device 102, 103 may be located remotely and accessed via a network. Accordingly, the system configuration illustrated in FIG. 11 is provided to generally illustrate how embodiments may be configured and implemented.

Method embodiments of the present invention, including the functions performed by the system 40 and it components, may also be embodied in, or readable from, a computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 304 performs steps or executes program instructions 302 within memory 300 and/or embodied on the carrier to implement method embodiments.

Embodiments, however, are not so limited and implementation of embodiments may vary depending on the platform utilized. Accordingly, embodiments are intended to exemplify alternatives, modifications, and equivalents that may fall within the scope of the claims.

What is claimed is:

1. A computing system, comprising:
a computing device comprising a computer processor, a memory and a display;
a computerized tax return preparation application comprising computer executable instructions stored in the memory and executable by the processor, the computerized tax return preparation application being operable to generate an electronic tax return and comprising:
a shared data store configured to store user-specific data,
an interface controller in communication with the shared data store,
a tax calculation graph comprising a plurality of nodes including one or more of input nodes, functional nodes, function nodes and a plurality of calculation paths, each calculation path connecting a plurality of data dependent nodes,
a tax calculation engine in communication with the shared data store and configured to receive the tax calculation graph as an input,
a change analysis engine in communication with the tax calculation engine, and
an explanation engine in communication with the change analysis engine and the user interface controller and configured to generate an explanation of a reason why calculated values changed,
the tax calculation engine configured to read the user-specific data from the shared data store and perform a plurality of tax calculation operations utilizing the tax calculation graph,
the change analysis engine configured to access a first calculated tax calculation graph resulting from processing the tax calculation graph based on first tax data for the taxpayer, the first calculated tax calculation graph having a first calculated tax value for a first node of the tax calculation graph, and access a second calculated tax calculation graph resulting from processing the tax calculation graph based on second tax data for the taxpayer, the second calculated tax calculation graph having a second calculated tax value for the first node of the tax calculation graph, wherein the second tax data is different from the first tax data, the change analysis engine being further configured to analyze the first tax data and second tax data to determine one or more differences between the first tax data and second tax data, determine that the first calculated tax value differs from the second calculated tax value, analyze the first calculated tax calculation graph and the second calculated tax calculation graph to determine one or more changed nodes on the tax calculation graph, other than the first node and any input node(s), having values which differ between the first calculated tax calculation graph and the second calculated tax calculation graph,
the explanation engine being configured to generate an explanation of a reason that the first calculated tax value and the second calculated tax value for the first node differ based on the one or more changed nodes, the explanation engine comprising a natural language generator executable by the processor of the computing device for generating the explanation, and
the interface controller configured to receive the explanation and present the explanation to the user through a user interface presented through the display of the computing device.

2. The computing system of claim 1, wherein the change analysis system is configured to determine the one or more changed nodes by traversing the first calculated tax calculation graph and the second calculated tax calculation graph and comparing respective values for the respective calculated tax calculation graphs at corresponding nodes.

3. The computing system of claim 1, further comprising a plurality of impact chains for each of a plurality of the nodes determined based on the tax calculation graph, wherein an impact chain for a respective node consists of one of (a) each of the other nodes which are affected by the respective node, or (b) each of the other nodes which affect the respective node; and wherein the change analysis engine is configured to utilize one or more of the impact chains to analyze the first calculated tax calculation graph and the second calculated tax calculation graph to determine one or more nodes on the tax calculation graph having values which differ between the first calculated tax calculation graph and the second tax calculation graph.

4. The computing system of claim 1, further comprising rule-based logic agent in communication with the shared data store, the rule-based logic agent being configured to receive the user-specific data from the shared data store, determine which questions of the computerized tax return preparation application that remain unanswered based at least in part upon the received user-specific data and a data structure, generate a non-binding suggestion based at least in part upon the determined questions, and transmit the non-binding suggestion to the user interface controller.

5. The computing system of claim 4, the data structure comprising a table including respective rows and respective columns, wherein respective rules are defined by respective rows of the table and respective questions are defined by respective columns of the table.

6. The computing system of claim 4, wherein the user interface controller is configured to receive user input through the computer generated interview screen and to update the user-specific data stored in the shared data store to generate second user-specific data stored in the shared data store.

7. The computing system of claim 6, wherein tax calculation engine is configured to read the second user-specific data as the input and perform the plurality of tax calculation operations utilizing the tax calculation graph populated the second user-specific data.

8. The computing system of claim 7, wherein tax calculation engine is configured to update the second user-specific data stored in the shared data store based at least in part upon the plurality of tax calculation operations to generate third user-specific data stored in the shared data store.

9. The computing system of claim 8, wherein the rule-based logic agent is configured to read the third user-specific data stored in the shared data store, determine which questions of the computerized tax return preparation application remain unanswered based at least in part upon the third user-specific data and the data structure.

10. The computing system of claim 4, wherein the rule-based logic agent is configured to eliminate at least one rule defined by at least one row of the decision table based at least in part upon the user-specific data to reduce a number of candidate questions to include in a non-binding suggestion for the user interface controller.

11. The computing system of claim 1, wherein the change analysis engine is configured to traverse the first calculation graph node by node and the second calculation graph node by node to determine to that one or more changed nodes on the tax calculation graph, other than the first node and any input node, have values that differ between the first calculated tax calculation graph and the second calculated tax calculation graph.

12. The computing system of claim 1, wherein the user interface controller configured to present the explanation simultaneously with first tax data and second tax data.

13. The computing system of claim 1, wherein the shared data store is located remotely relative to the rule-based logic agent, the user interface controller and the calculation engine.

14. The computing system of claim 1, wherein at least one functional node or function node includes an explanation tag.

15. The computing system of claim 1, wherein the explanation engine is configured to generate an explanation having a level of detail based on a product version of the computerized tax return preparation application.

16. The computing system of claim 1, the user interface comprising:
a first window comprising tax data from the first calculated tax calculation graph;
a second window comprising tax data from the second calculated tax calculation graph; and
an explanation window including the generated explanation.

* * * * *